United States Patent
Lamoreux et al.

(10) Patent No.: US 7,719,227 B2
(45) Date of Patent: May 18, 2010

(54) ELECTRICAL ENERGY SUPPLY METHODS AND ELECTRICAL ENERGY POWER SUPPLIES

(75) Inventors: Joseph Lamoreux, Austin, TX (US); John Cummings, Round Rock, TX (US); Lawrence Stone, Austin, TX (US)

(73) Assignee: Valence Technology, Inc., Las Vegas, NV (US)

( * ) Notice: Subject to any disclaimer, the term of this patent is extended or adjusted under 35 U.S.C. 154(b) by 1273 days.

(21) Appl. No.: 11/056,032

(22) Filed: Feb. 10, 2005

(65) Prior Publication Data
US 2005/0266300 A1    Dec. 1, 2005

Related U.S. Application Data

(60) Provisional application No. 60/544,769, filed on Feb. 13, 2004.

(51) Int. Cl.
*H02J 7/00* (2006.01)
(52) U.S. Cl. ........................... 320/107; 320/112
(58) Field of Classification Search ................ 320/107, 320/110, 112, 103; 429/9, 96, 99, 100
See application file for complete search history.

(56) References Cited

U.S. PATENT DOCUMENTS

| | | |
|---|---|---|
| 3,237,078 A | 2/1966 | Mallory |
| 4,477,541 A | 10/1984 | Fraioli |
| 4,668,595 A | 5/1987 | Yoshino et al. |
| 4,792,504 A | 12/1988 | Schwab et al. |
| 4,830,939 A | 5/1989 | Lee et al. |
| 4,935,317 A | 6/1990 | Fauteux et al. |
| 4,990,413 A | 2/1991 | Lee et al. |
| 5,037,712 A | 8/1991 | Shackle et al. |
| 5,262,253 A | 11/1993 | Golovin |

(Continued)

FOREIGN PATENT DOCUMENTS

JP    2000078759    3/2000

(Continued)

OTHER PUBLICATIONS

"Chemistries;" www.valence.com/chemistries.asp; Jan. 7, 2004; 4 pps.

(Continued)

*Primary Examiner*—Edward Tso
*Assistant Examiner*—Richard V Muralidar
(74) *Attorney, Agent, or Firm*—Brian T. Mangum; Cynthia S. Kovacevic; Roger A. Williams

(57) ABSTRACT

Electrical energy supply methods and electrical energy power supplies are described. According to one aspect, an electrical energy supply method includes providing first and second battery assemblies individually configured to store electrical energy, coupling the first and second battery assemblies to form a unitary device configured to supply electrical energy to a load, charging one of the first and the second battery assemblies using electrical energy from a supply at a first moment in time, discharging electrical energy from the first and second battery assemblies to the load at a second moment in time, and disabling discharging of electrical energy from the other of the first and second battery assemblies during the charging.

37 Claims, 15 Drawing Sheets

U.S. PATENT DOCUMENTS

| | | | |
|---|---|---|---|
| 5,300,373 | A | 4/1994 | Shackle |
| 5,347,211 | A | 9/1994 | Jakubowski |
| 5,399,447 | A | 3/1995 | Chaloner-Gill et al. |
| 5,411,820 | A | 5/1995 | Chaloner-Gill et al. |
| 5,418,091 | A | 5/1995 | Gozdz et al. |
| 5,435,054 | A | 7/1995 | Tonder et al. |
| 5,463,179 | A | 10/1995 | Chaloner-Gill et al. |
| 5,482,795 | A | 1/1996 | Chaloner-Gill |
| 5,508,130 | A | 4/1996 | Golovin |
| 5,541,020 | A | 7/1996 | Golovin et al. |
| 5,616,436 | A | 4/1997 | Sonobe et al. |
| 5,620,810 | A | 4/1997 | Golovin et al. |
| 5,635,814 | A | 6/1997 | Afzal et al. |
| 5,643,695 | A | 7/1997 | Barker et al. |
| 5,660,948 | A | 8/1997 | Barker |
| 5,700,298 | A | 12/1997 | Shi et al. |
| 5,712,059 | A | 1/1998 | Barker et al. |
| 5,821,733 | A | 10/1998 | Turnbull |
| 5,830,602 | A | 11/1998 | Barker et al. |
| 5,851,504 | A | 12/1998 | Barker et al. |
| 5,869,208 | A | 2/1999 | Miyasaka |
| 5,871,866 | A | 2/1999 | Barker et al. |
| 5,882,821 | A | 3/1999 | Miyasaka |
| 5,910,382 | A | 6/1999 | Goodenough et al. |
| 6,020,087 | A | 2/2000 | Gao |
| 6,027,828 | A * | 2/2000 | Hahn ............... 429/100 |
| 6,085,015 | A | 7/2000 | Armand et al. |
| 6,103,419 | A | 8/2000 | Saidi et al. |
| 6,136,472 | A | 10/2000 | Barker et al. |
| 6,153,333 | A | 11/2000 | Barker |
| 6,203,946 | B1 | 3/2001 | Barker et al. |
| 6,291,972 | B1 | 9/2001 | Zhang |
| 6,306,215 | B1 | 10/2001 | Larkin |
| 6,387,568 | B1 | 5/2002 | Barker et al. |
| 6,514,640 | B1 | 2/2003 | Armand et al. |
| 6,528,033 | B1 | 3/2003 | Barker et al. |
| 6,667,599 | B2 | 12/2003 | Stone et al. |
| 6,774,604 | B2 * | 8/2004 | Matsuda et al. ............ 320/110 |
| 2001/0055718 | A1 | 12/2001 | Li et al. |
| 2002/0192553 | A1 | 12/2002 | Barker et al. |
| 2003/0027049 | A1 | 2/2003 | Barker et al. |
| 2003/0129492 | A1 | 7/2003 | Barker et al. |
| 2003/0170542 | A1 | 9/2003 | Barker et al. |

FOREIGN PATENT DOCUMENTS

| | | |
|---|---|---|
| JP | 2000173674 | 6/2000 |
| JP | 2000-0296108 | 9/2000 |
| JP | 2000294298 A | 10/2000 |
| JP | 2002110259 | 4/2002 |
| WO | WO98/12761 | 3/1998 |
| WO | WO00/01024 | 1/2000 |
| WO | WO00/31812 | 6/2000 |
| WO | WO00/57505 | 9/2000 |
| WO | WO01/54212 A1 | 7/2001 |
| WO | WO 02/27824 A1 | 4/2002 |
| WO | WO02/44084 | 6/2002 |
| WO | WO 02/083555 A2 | 10/2002 |
| WO | WO03/085757 | 3/2003 |
| WO | WO 03/056646 A1 | 7/2003 |
| WO | WO03/085771 | 10/2003 |
| WO | WO03/088383 A1 | 10/2003 |

OTHER PUBLICATIONS

"Saphion™ Technology;" www.valence.com/technologies.asp; Jan. 7, 2004; 2 pps.

"Saphion™ Technology;" www.valence.com/saphion.asp; Jan. 7, 2004; 2 pps.

"$AM^VM^{III}(PO_4)_3$: New Mixed-Metal Phosphates Having NAISCON and Related Structures;" Tangan et al.; Inorganic Chemistry, vol. 34, No. 7; 1995; pp. 1969-1972.

"$V_2(PO_4)_3$: A Novel NASICON-Type Vanadium Phosphate Synthesized by Oxidative Deintercalation of Sodium From $Na_3 V_2(PO_4)_3$;" Chemistry of Materials, vol. 4, No. 4; Jul./Aug. 1992; pp. 745-747.

"Cathodes for Lithium-Ion Batteries: Some Comparisons;" Goodenough et al.; Denki Kagaku, vol. 66, No. 12; 1998; pp. 1173-1181.

"Patents;" www.valence.com/patents.asp; Jan. 7, 2004; 2 pps.

* cited by examiner

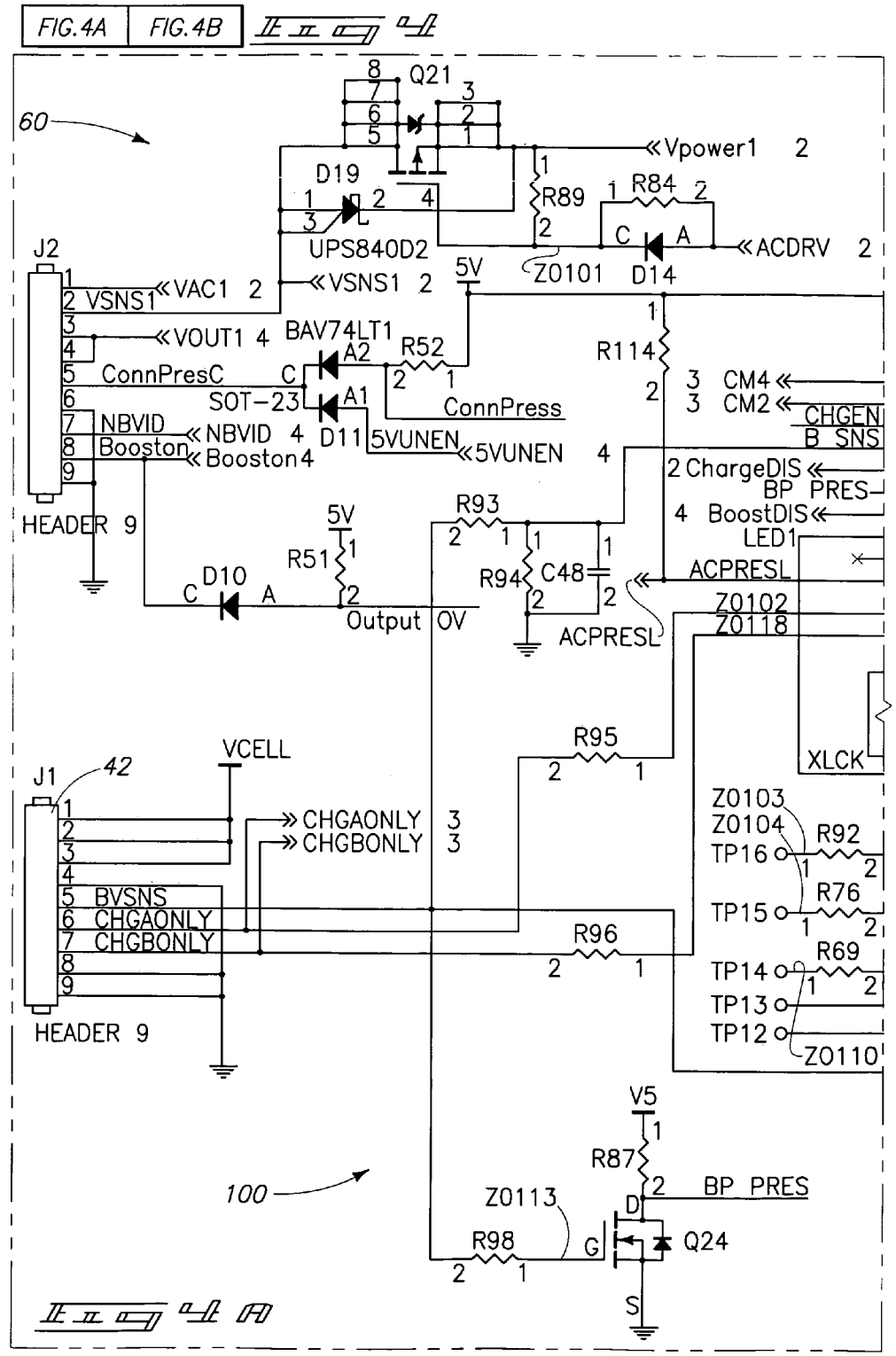

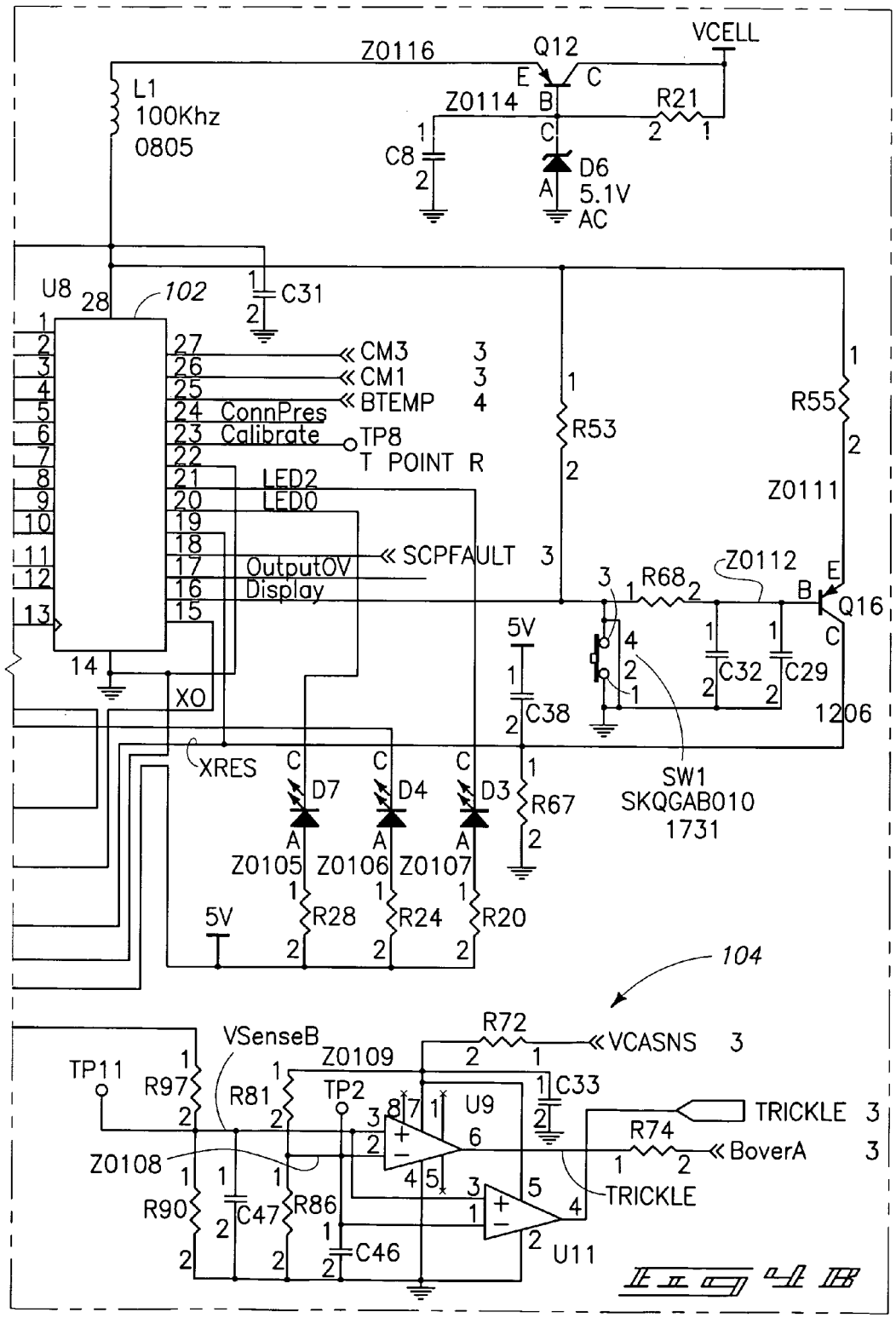

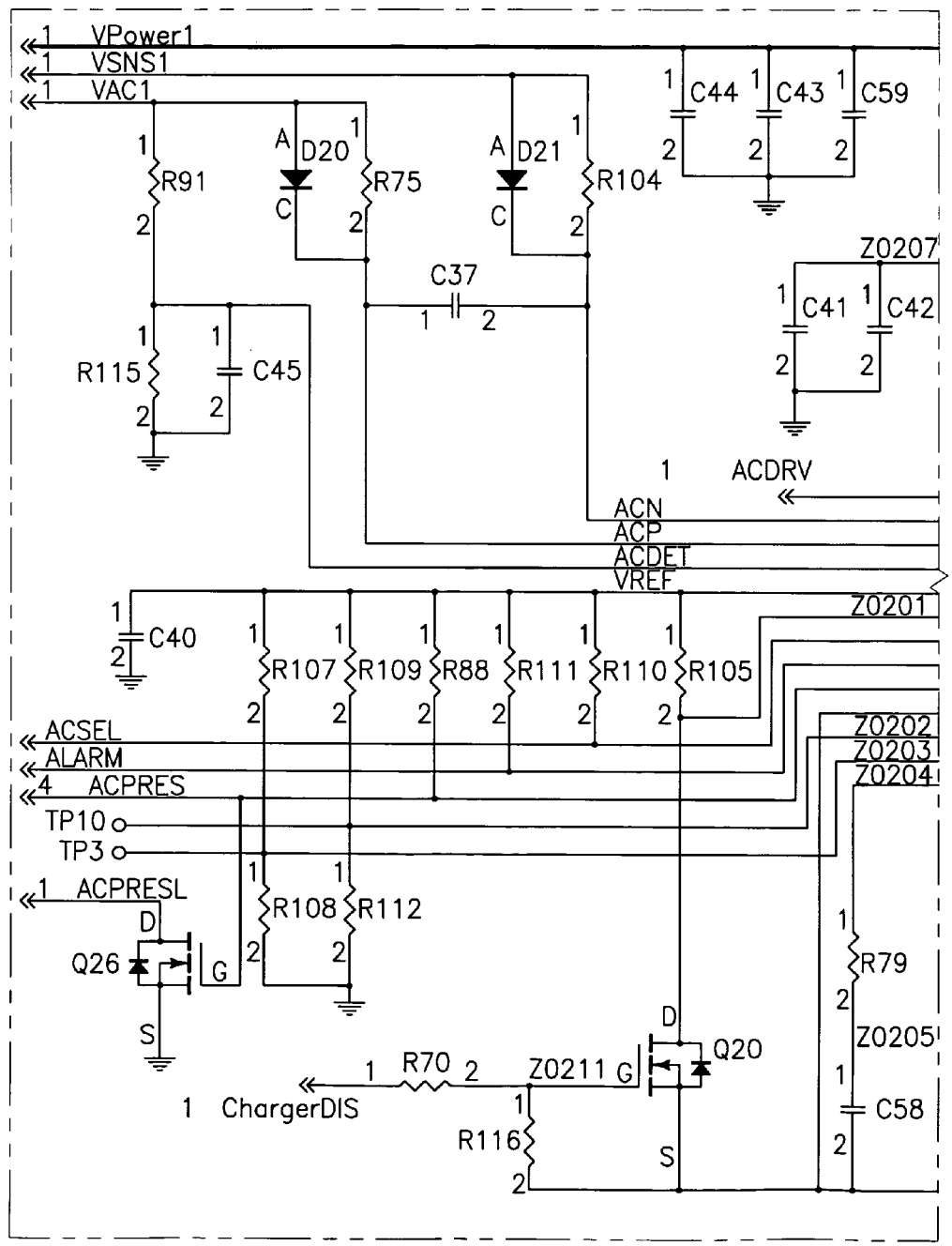

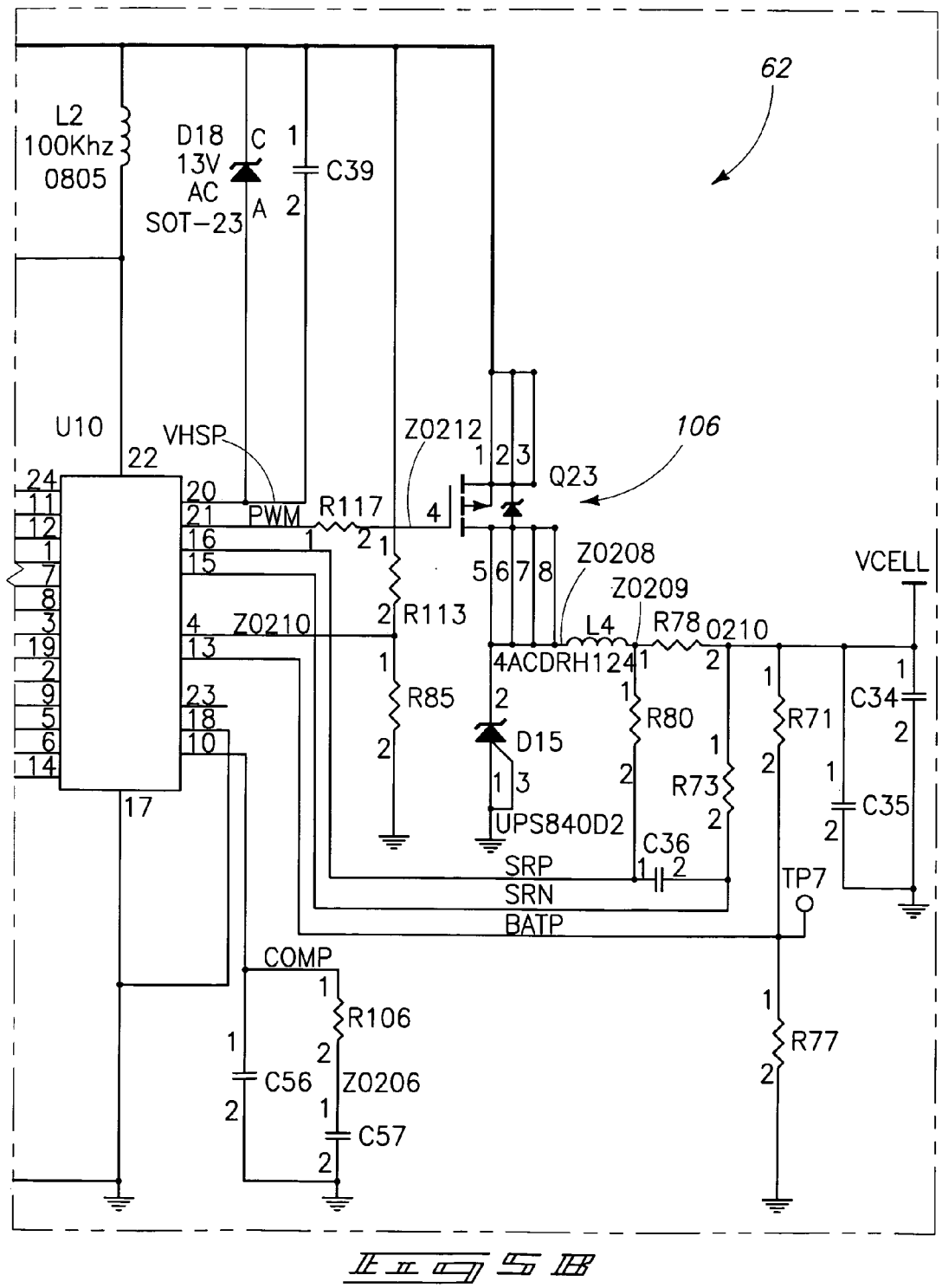

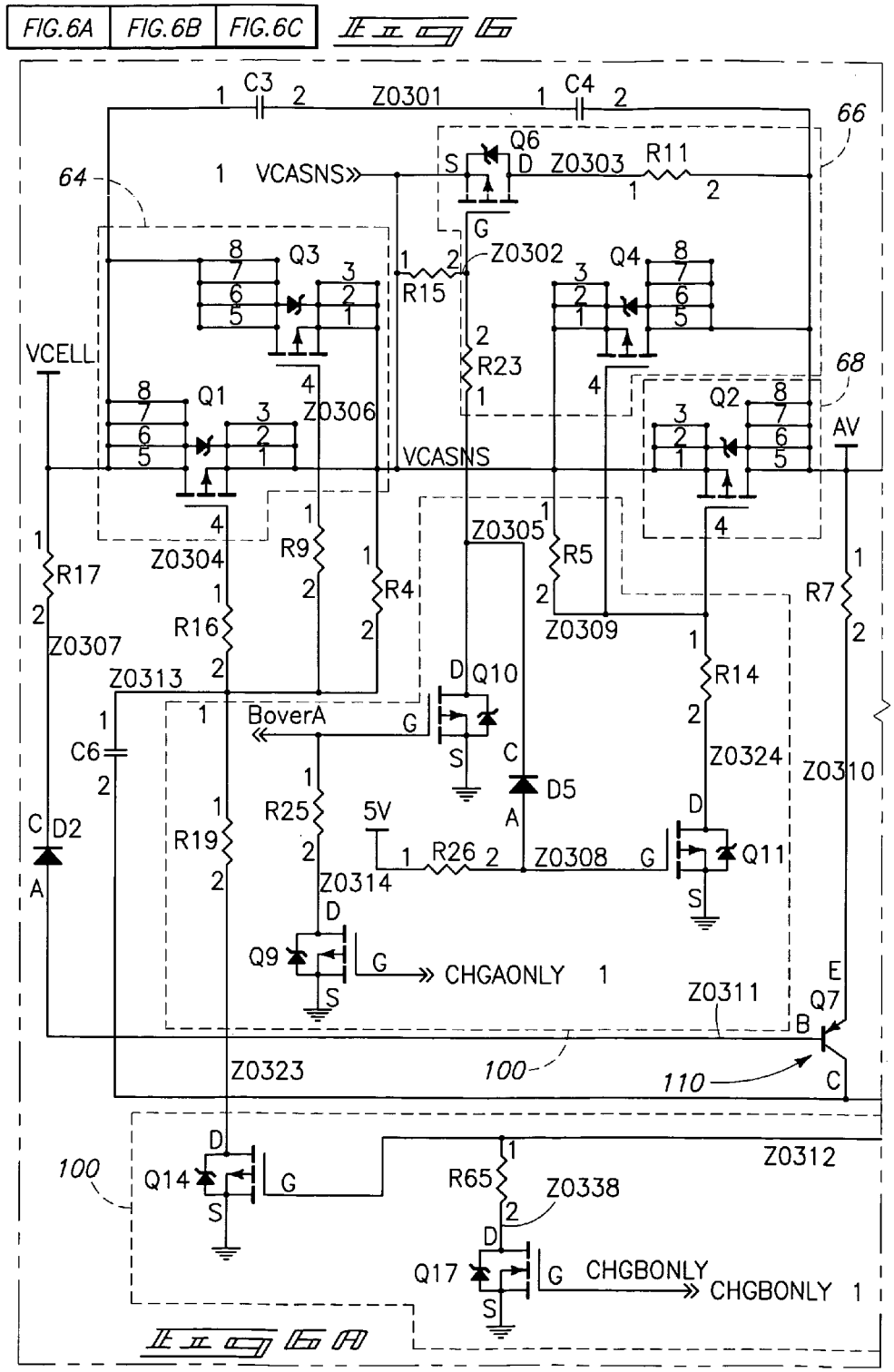

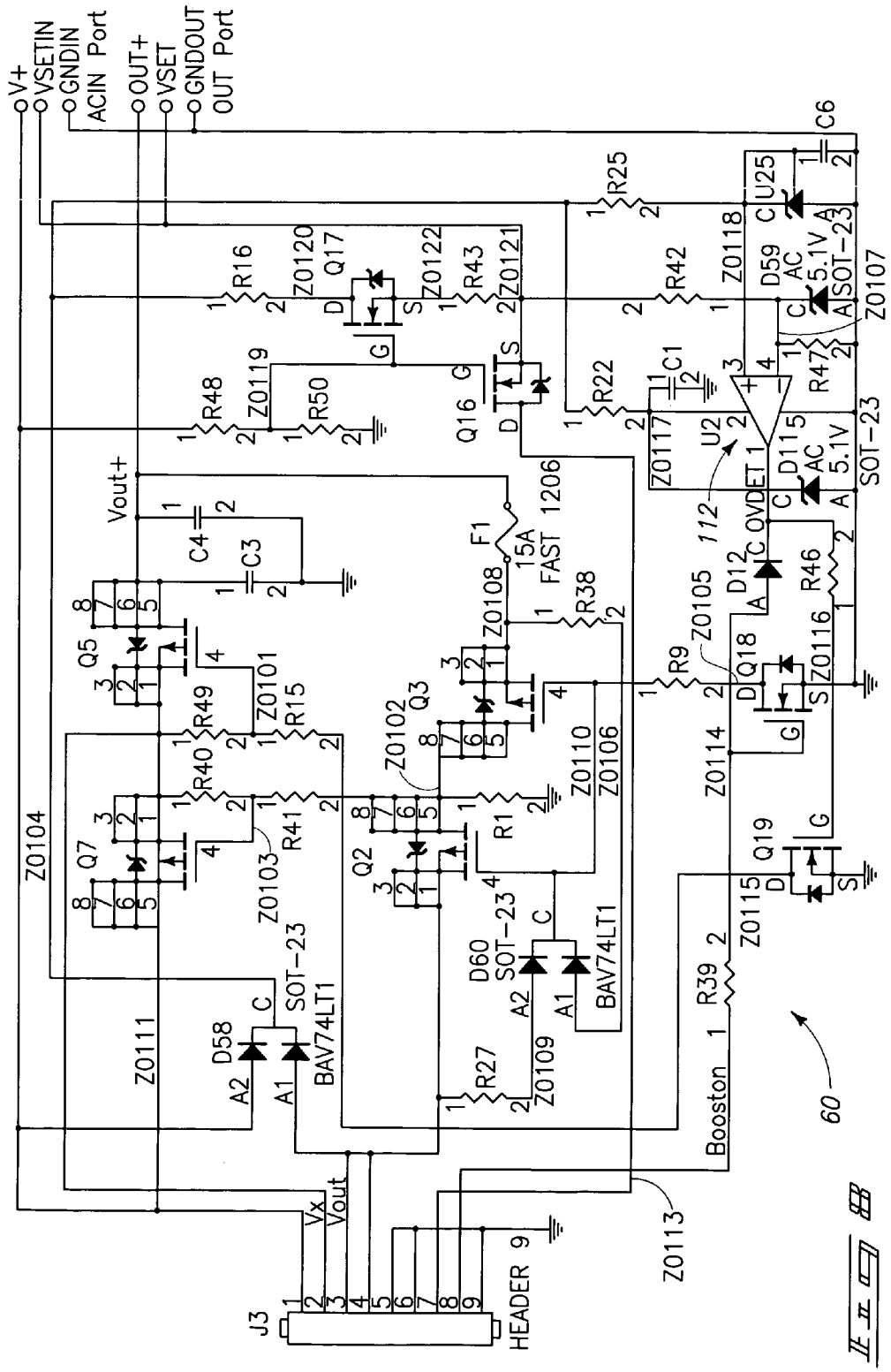

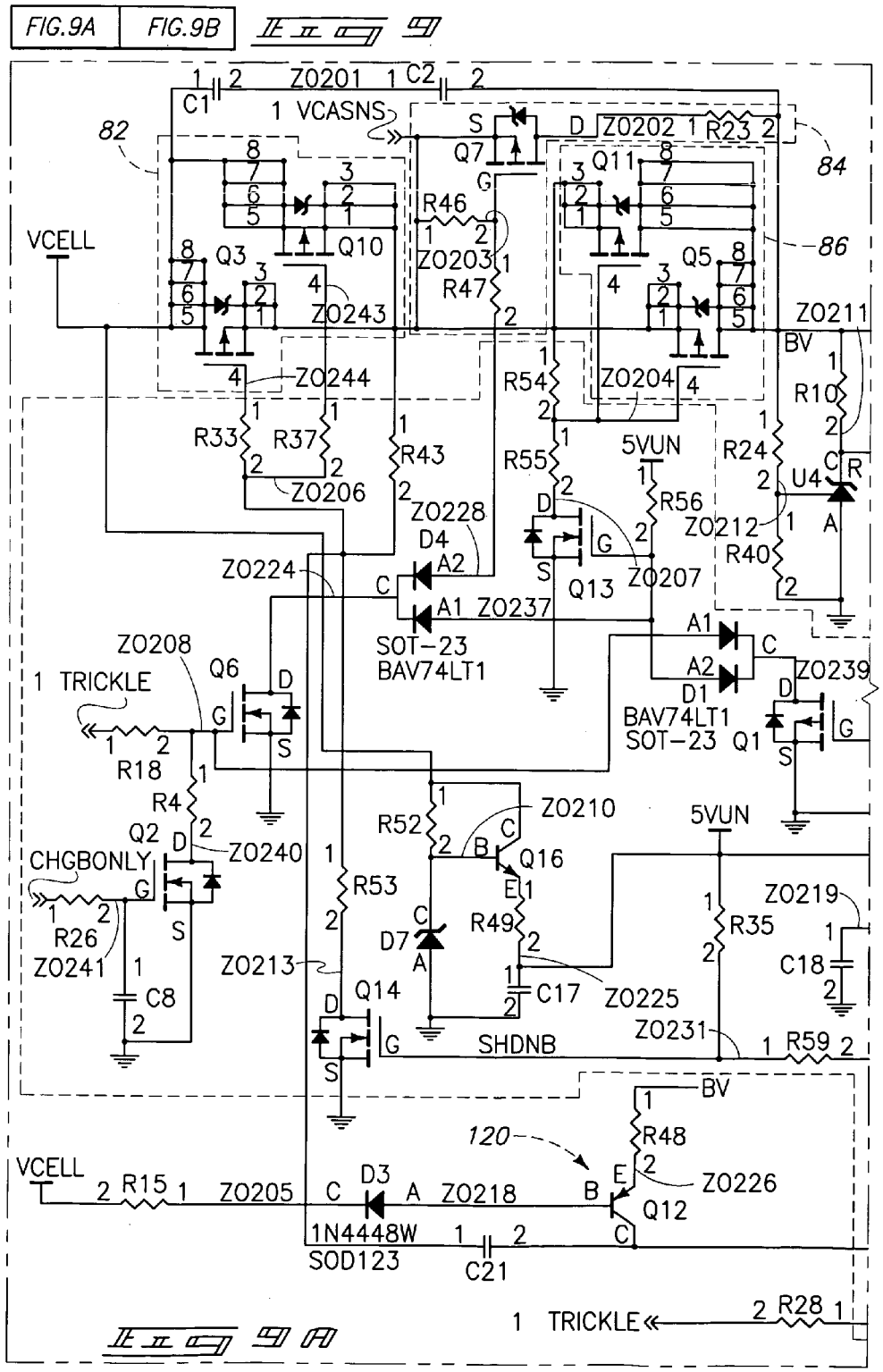

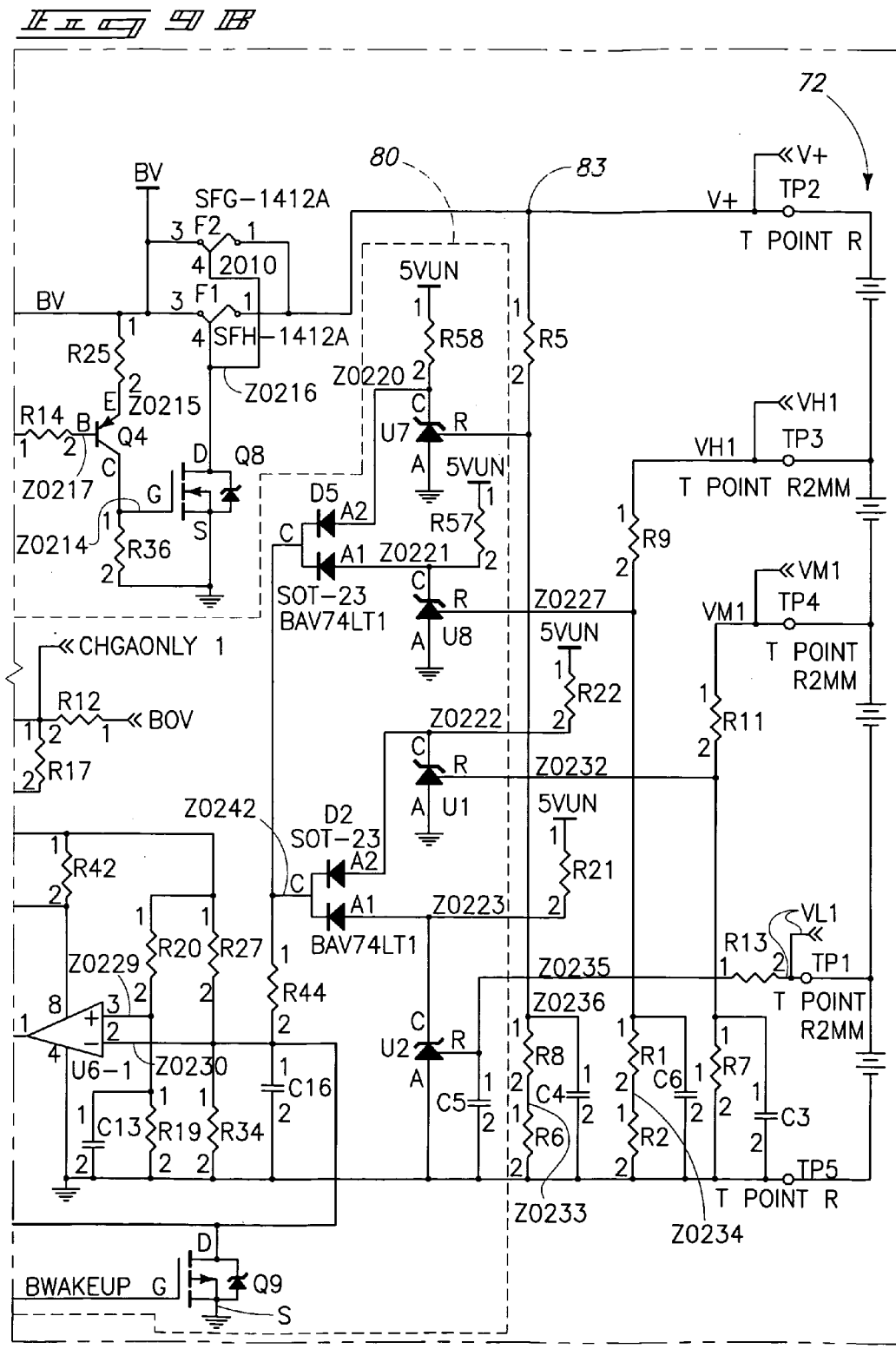

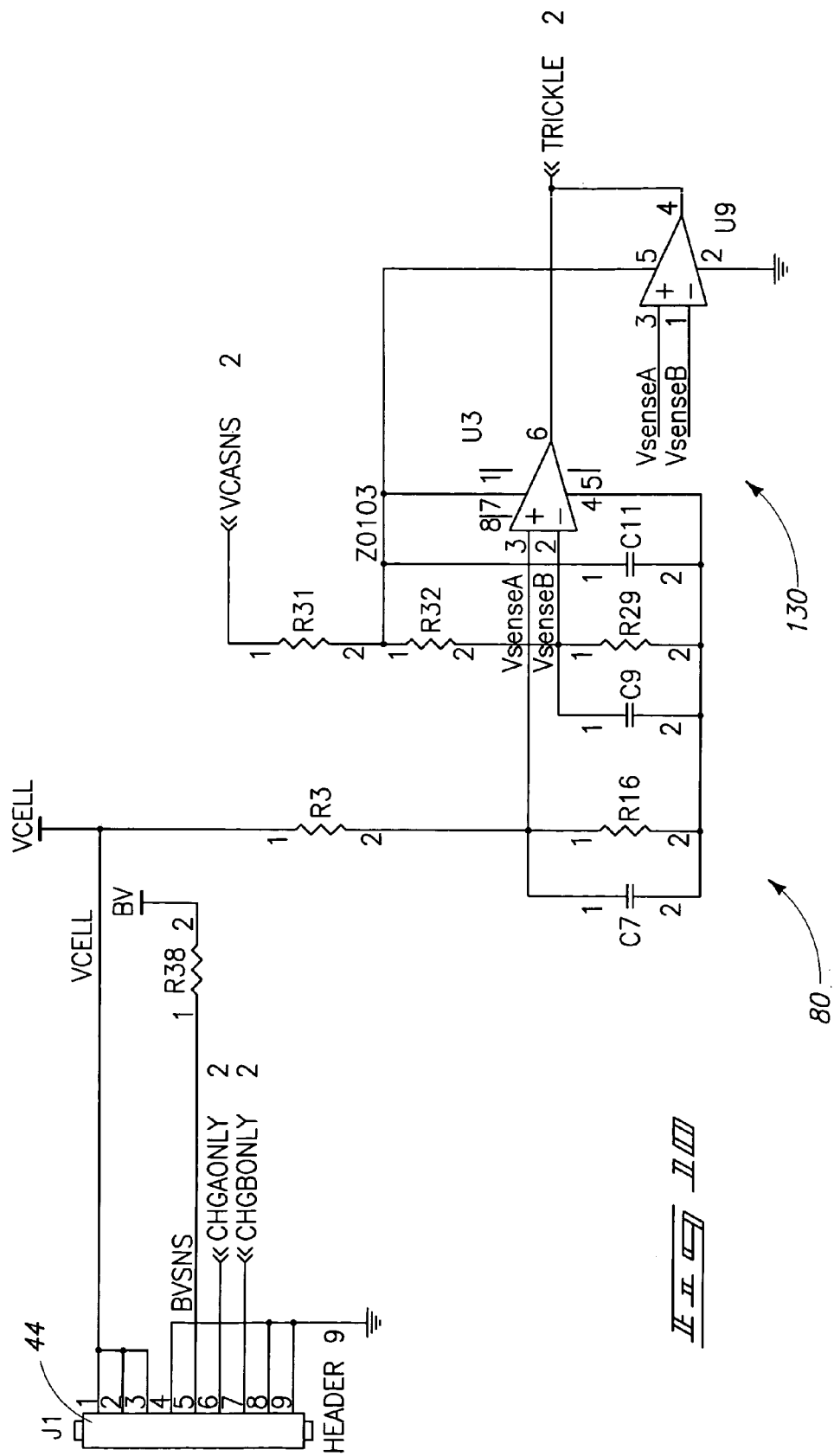

ELECTRICAL ENERGY SUPPLY METHODS AND ELECTRICAL ENERGY POWER SUPPLIES

CROSS REFERENCE TO RELATED APPLICATIONS

This patent claims priority to U.S. Provisional Patent Application Ser. No. 60/544,769, filed Feb. 13, 2004, entitled "Electrical Energy Supply Methods And Electrical Energy Power Supplies", the disclosure of which is incorporated by reference.

TECHNICAL FIELD

This invention relates to electrical energy supply methods and electrical energy power supplies.

BACKGROUND OF THE INVENTION

The sophistication and uses of electrical devices have increased dramatically in recent years. Consumer items having electrical components are ubiquitous in communications, computing, entertainment, etc. The size of mobile telephones, notebook computers, music players, and other devices has continued to decrease while the capabilities and quality of the devices continues to increase as modern electronic components used in such devices are developed and improved upon.

Numerous people rely upon or have grown accustomed to usage of electrical consumer devices for business, education, or for other needs. Electronic consumer devices are increasingly portable to accommodate these needs during travels from home or the workplace. The sophistication and capabilities of power supplies for such devices have also improved to meet the requirements of the electronic consumer devices. For example, cost, size, and capacity are some product characteristics which have been improved for the portable power supplies for electronic applications. There is a desire to enhance these and other design parameters of portable power supplies to accommodate increasing popularity and power requirements of the modern electronic consumer devices.

BRIEF DESCRIPTION OF THE DRAWINGS

Exemplary embodiments of the disclosure are described below with reference to the following accompanying drawings.

FIG. 4 is a map illustrating how FIGS. 4A-4B are to be assembled.

FIGS. 4A-4B, once assembled, are a schematic diagram illustrating exemplary circuitry of one of a plurality of battery assemblies of the electrical energy power supply according to one embodiment.

FIG. 5 is a map illustrating how FIGS. 5A-5B are to be assembled.

FIGS. 5A-5B, once assembled, are a schematic diagram illustrating additional exemplary circuitry of one of the battery assemblies according to one embodiment.

FIG. 6 is a map illustrating how FIGS. 6A-6C are to be assembled.

FIGS. 6A-6C, once assembled, are a schematic diagram illustrating additional exemplary circuitry of one of the battery assemblies according to one embodiment.

FIG. 7 is a schematic diagram illustrating additional exemplary circuitry of one of the battery assemblies according to one embodiment.

FIG. 8 is a schematic diagram illustrating additional exemplary circuitry of one of the battery assemblies according to one embodiment.

FIG. 9 is a map illustrating how FIGS. 9A-9B are to be assembled.

FIGS. 9A-9B, once assembled, are a schematic diagram illustrating exemplary circuitry of an other of the battery assemblies of the supply according to one embodiment.

FIG. 10 is a schematic diagram illustrating additional exemplary circuitry of the other of the battery assemblies according to one embodiment.

DETAILED DESCRIPTION OF THE PREFERRED EMBODIMENTS

Figure 1:
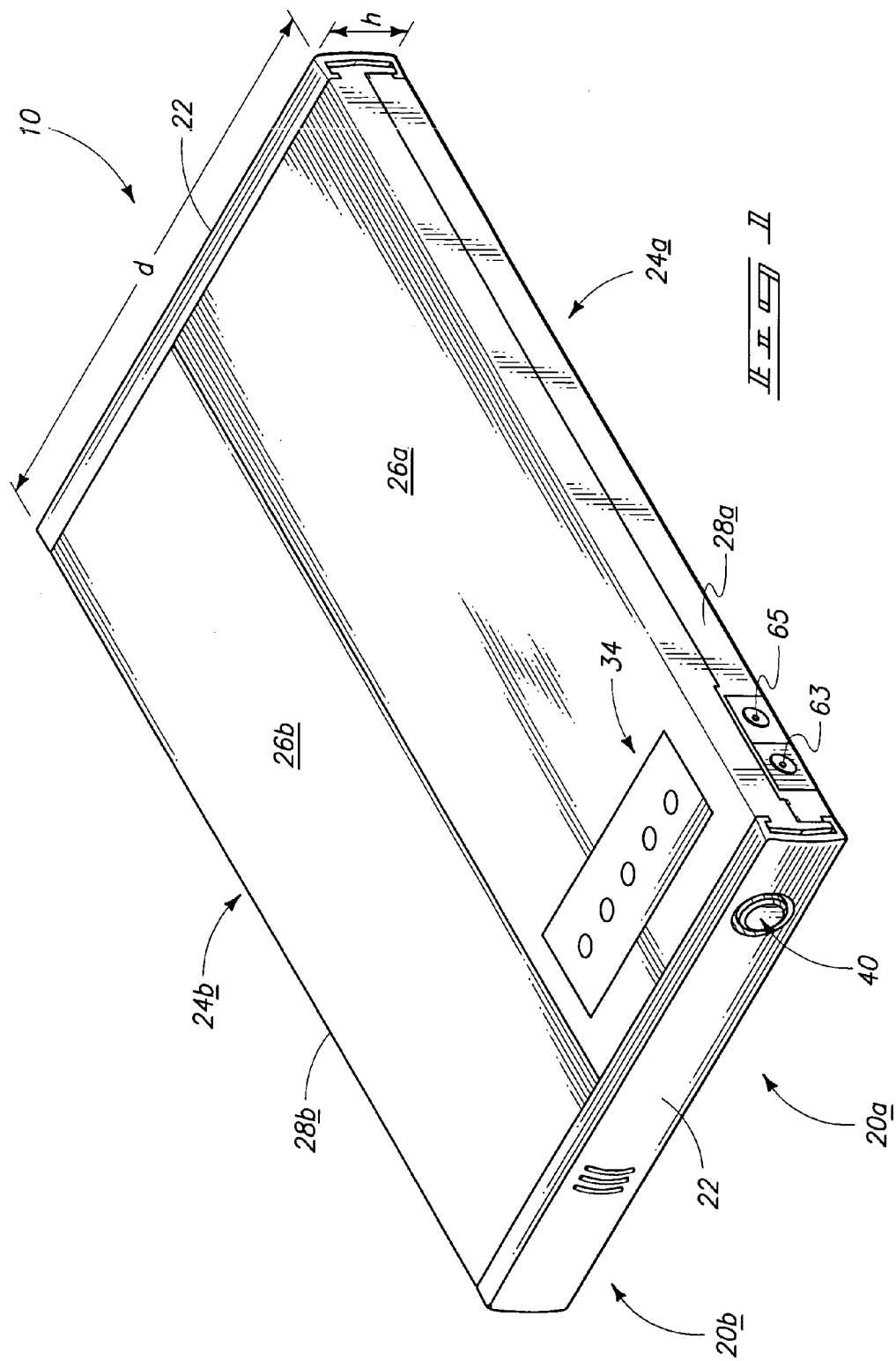
FIG. 1 is an isometric view of an exemplary electrical energy power supply according to one embodiment.

This disclosure of the invention is submitted in furtherance of the constitutional purposes of the U.S. Patent Laws "to promote the progress of science and useful arts" (Article 1, Section 8).

According to one embodiment, an electrical energy supply method comprises providing first and second battery assemblies individually configured to store electrical energy, coupling the first and second battery assemblies to form a unitary device configured to supply electrical energy to a load, charging one of the first and the second battery assemblies using electrical energy from a supply at a first moment in time, discharging electrical energy from the first and second battery assemblies to the load at a second moment in time, and disabling discharging of electrical energy from the other of the first and second battery assemblies during the charging.

According to another embodiment, an electrical energy supply method comprises providing first and second battery assemblies individually configured to store electrical energy, coupling the first and second battery assemblies to form a unitary device configured to supply electrical energy to a load, providing electrical energy to the coupled first and second battery assemblies using a supply, charging only one of the coupled first and second battery assemblies using the electrical energy from the supply at a first moment in time, and providing electrical energy stored using the first and the second battery assemblies to the load at a second moment in time.

According to yet another embodiment, an electrical energy supply method comprises providing first and second battery assemblies individually configured to store electrical energy, coupling the first and second battery assemblies to form a unitary device configured to supply electrical energy to a load, providing electrical energy from the battery assemblies to the load during an absence of electrical energy from a supply, first charging one of the coupled battery assemblies having a voltage less than a voltage of the other of the coupled battery assemblies using electrical energy from the other of the battery assemblies, providing electrical energy from a supply to the device during the first charging, second charging the one of the battery assemblies using the electrical energy from the supply, and disabling the first charging responsive to the providing the electrical energy from the supply.

According to still another embodiment, an electrical energy power supply comprises a first battery assembly comprising a housing and at least one electrochemical device configured to store electrical energy, a second battery assembly comprising a housing and at least one electrochemical device configured to store electrical energy, wherein the housings are configured to be removably coupled with one another and to form a unitary device during coupling thereof, a connector coupled with the first and second battery assemblies and configured to receive electrical energy from a supply, and control circuitry configured to detect the presence of electrical energy from the supply and to control application of the electrical energy to only one of the first and the second battery assemblies responsive to the one of the first and the second battery assemblies having a voltage less than a voltage of the other of the first and the second battery assemblies.

According to an additional embodiment, an electrical energy power supply comprises a first battery assembly comprising a housing and at least one electrochemical device configured to store electrical energy, a second battery assembly comprising a housing and at least one electrochemical device configured to store electrical energy, wherein the housings are configured to be removably coupled with one another and to form a unitary device during coupling thereof, and control circuitry configured to control charging of the electrochemical devices of the first and second battery assemblies to only use electrical energy from a supply at a first moment in time and to control charging of one of the first and second battery assemblies to only use electrical energy from the other of the first and second battery assemblies at a second moment in time.

According to still another embodiment, an electrical energy power supply comprises a first battery assembly comprising a housing and at least one electrochemical device configured to store electrical energy, a second battery assembly comprising a housing and at least one electrochemical device configured to store electrical energy, wherein the housings are configured to be removably coupled with one another and to form a unitary device during coupling thereof, a voltage converter electrically coupled with the first and second battery assemblies and configured to convert electrical energy from the first and second battery assemblies to one of a plurality of output voltages, and a connector configured to apply electrical energy from the voltage converter to a load and to define the one of the plurality of output voltages corresponding to the load.

According to an additional embodiment, an electrical energy power supply comprises a first battery assembly comprising an electrical connector, at least one electrochemical storage device configured to store electrical energy, and a first housing including a top surface, a bottom surface and at least one side surface between the top surface and the bottom surface, wherein the at least one side surface has a smallest dimension less than a smallest dimension of the top surface and the bottom surface, a second battery assembly comprising an electrical connector configured to electrically connect with the electrical connector of the first battery assembly, at least one electrochemical storage device configured to store electrical energy, and a second housing including a top surface, a bottom surface and at least one side surface between the top surface and the bottom surface of the second housing, wherein the at least one side surface has a smallest dimension less than a smallest dimension of the top surface and the bottom surface of the second housing, and at least one support member configured to mechanically couple the housings of the first and the second battery assemblies to form a unitary device.

Figure 2:
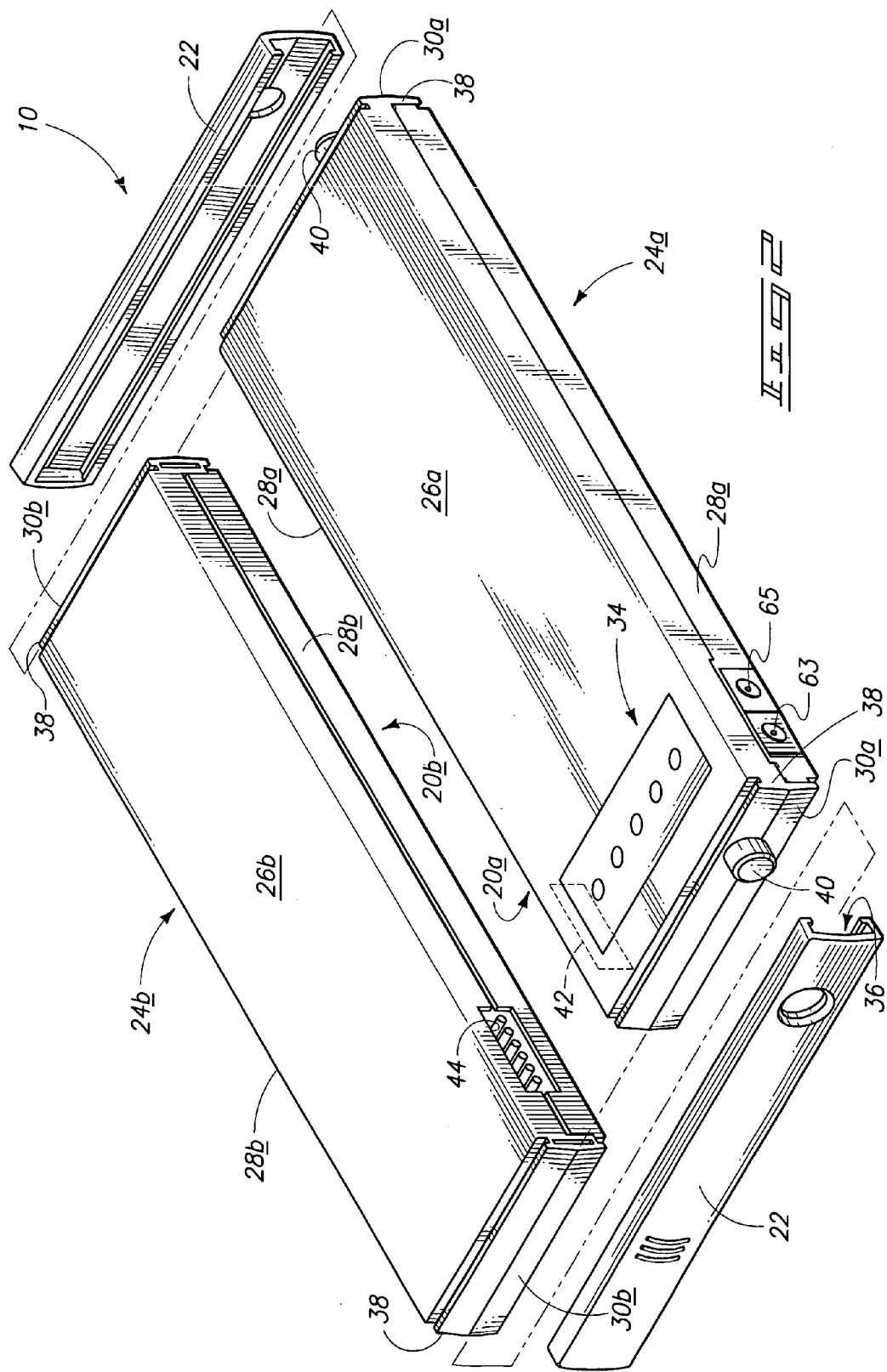
FIG. 2 is another isometric view of the exemplary electrical energy power supply of FIG. 1.

Referring to FIGS. 1 and 2, one embodiment of a portable electrical energy power supply 10 is shown. Power supply 10 may be utilized to power electrical loads, such as notebook computers, cell phones, personal digital assistants (PDA), or other consumer electronic devices. Power supply 10 may be configured differently at different times. In the described embodiment, supply 10 includes a plurality of battery assemblies which may be removably coupled with respect to one another providing a supply 10 having an electrical energy capacity corresponding to two of the battery assemblies in a coupled operative state (shown in FIG. 1) and a reduced capacity corresponding to one of the battery assemblies in a decoupled operative state (shown in FIG. 2). For example, the battery assemblies may be coupled to increase the capacity of power supply 10 or decoupled for convenience, reduced size or other reasons.

According to the described exemplary embodiment, powers supply 10 includes a plurality of battery assemblies 20a, 20b and a plurality of support members 22. Battery assemblies 20a, 20b are configured to removably couple with one another to vary the capacity of power supply 10 for usage in different applications, etc. For example, at one moment in time, it may be desired or otherwise suitable to utilize one of battery assemblies 20a, 20b to provide electrical energy to a load (not shown in FIG. 1 or 2) while at another moment in time it may be desired to utilize a plurality of battery assemblies 20a, 20b (or more) to power a load.

Battery assemblies 20a, 20b comprise respective housings 24a, 24b individually configured to house one or more electrochemical device configured to store electrical energy and circuitry and other components associated with the electrochemical device(s) (not shown in FIG. 1 or 2). Housings 24a, 24b individually respectively comprise a top surface 26a, 26b, a bottom surface opposite to the respective top surface, and a plurality of side surfaces 28a, 28b, 30a, 30b (surfaces 30a, 30b are labeled in FIG. 2) intermediate respective ones of the opposing top surfaces 26a, 26b and bottom surfaces. In the depicted embodiment, side surfaces 28a, 28b, 30a, 30b include a smallest dimension (e.g., height "h" in FIG. 1) less than a smallest dimension of the top and bottom surfaces.

In the described embodiment, battery assembly 20a may be referred to as a master device and battery assembly 20b may be referred to as a slave device. Battery assembly 20a is configured to operate (e.g., provide charge and/or discharge operations) independently or in conjunction with battery assembly 20b while battery assembly 20b is only intended to operate in conjunction with battery assembly 20a in the described embodiment. In one operational aspect, assembly 20a may operate independently to provide electrical energy to a load at a first moment in time, and thereafter at a second moment in time, assembly 20b may be coupled with assembly 20a to also provide electrical energy to the load. In the presently described embodiment, assembly 20b is only configured to supply electrical energy to a load when coupled with assembly 20a.

Accordingly, in at least one embodiment, battery assemblies 20a, 20b may be configured differently. For example, as shown in FIG. 1, battery assembly 20a may include one or more status indicators 34, such as light emitting diodes (LEDs), configured to indicate status or operations (e.g., capacity, charging, discharging, etc.) of assembly 20a during stand-alone operation or of both assemblies 20a, 20b when coupled with one another. Other configurations of power supply 10 are possible wherein plural battery assemblies of supply 10 are configured to operate independently or in conjunction with one another and may comprise substantially the same (or identical) components and circuitry for implementing charging and discharging operations.

As mentioned above, battery assemblies 20a, 20b may be coupled with one another in at least one embodiment. In one embodiment, it is desired to minimize any movement of a coupled one of the battery assemblies 20a, 20b with respect to the other to reduce stresses and surges to electrical connections (e.g., connectors 42, 44 described below) intermediate the battery assemblies 20a, 20b. Once coupled, battery assemblies 20a, 20b form a unitary device. In the depicted embodiment, one or more support members 22 mechanically couple and secure housings 24a, 24b of assemblies 20a, 20b to form a unitary device. Individual support members 22 may have a thickness substantially corresponding or equal to the height "h" of the side surfaces of housings 24a, 24b in one embodiment. Further, support members 22 may be configured to extend a distance "d" substantially equal to largest dimensions of the side surfaces 30a, 30b in one embodiment. In such a configuration, support members 22 may be configured to establish a load-bearing junction with respect to housings 24a, 24b along substantially an entirety of distance "d." For example, in the illustrated embodiment, support members 22 may be configured as rails individually having a grove 36 configured to receive a track 38 formed in the side surfaces 30a, 30b of battery assemblies 20a, 20b. Support members 22 configured as rails in one embodiment provide significant resistance to applied forces and provide rigidity to the unitary supply 10 when both assemblies 20a, 20b are coupled with one another. Other configurations of support members 22 or attachment configurations are possible.

A securing member 40 may be provided to secure and maintain battery assemblies 20a, 20b in a fixed coupled arrangement when desired. In the depicted exemplary configuration, securing member 40 comprises a spring-loaded post which may be depressed by a user when de-coupling of the battery assemblies 20a, 20b is desired. If decoupled, covers (not shown) configured similar to support members 22 may be slid over tracks 38 of battery assembly 20a and/or 20b to protect tracks 38, for aesthetics, etc. The covers may be identical to support members 22 but with a reduced length corresponding to the length of tracks 38 of battery assembly 20a or 20b.

Battery assemblies 20a, 20b may include respective electrical connectors 42, 44 (shown in the mating side surfaces 28a, 28b of the exemplary configuration of FIG. 2). Once battery assemblies 20a, 20b are coupled, electrical connectors 42, 44 are provided in electrical communication. Electrical energy for powering a load or charging electrochemical cells may be communicated intermediate assemblies 20a, 20b using electrical connectors 42, 44. Also, control or other signals may also be exchanged using electrical connectors 42, 44 in one embodiment. Additional details regarding exemplary charging, discharging, and communication of control signals are described further below according to one embodiment. Additional electrical couplings 63, 65 are shown in FIG. 1 and are configured to provide electrical coupling between external devices and supply 10. For example, couplings 63, 65 may provide connectivity to an external supply and load, respectively.

Once assembled battery assemblies 20a, 20b are coupled to form a unitary device, a top surface of supply 10 may be defined by top surfaces 26a, 26b of the respective housings 24a, 24b (and surfaces 26a, 26b may also define a footprint of supply 10). In one embodiment, the top surface is substantially planar. Further, according to one aspect, no portions of battery assemblies 20a, 20b extend elevationally above a plane corresponding to the top surface of the unitary device. According to this described exemplary embodiment, other structures, such as powered loads, may be securely and evenly placed on top of the unitary device. This described arrangement may facilitate usage of the power supply 10 in conjunction with an associated load in confined areas (e.g., powering a load such as a notebook computer over the unitary device while seated in an airplane seat).

The above configuration of battery assemblies 20a, 20b including the housings 24a, 24b is exemplary and other arrangements for housing the removably coupled battery assemblies 20a, 20b are possible.

Figure 3:
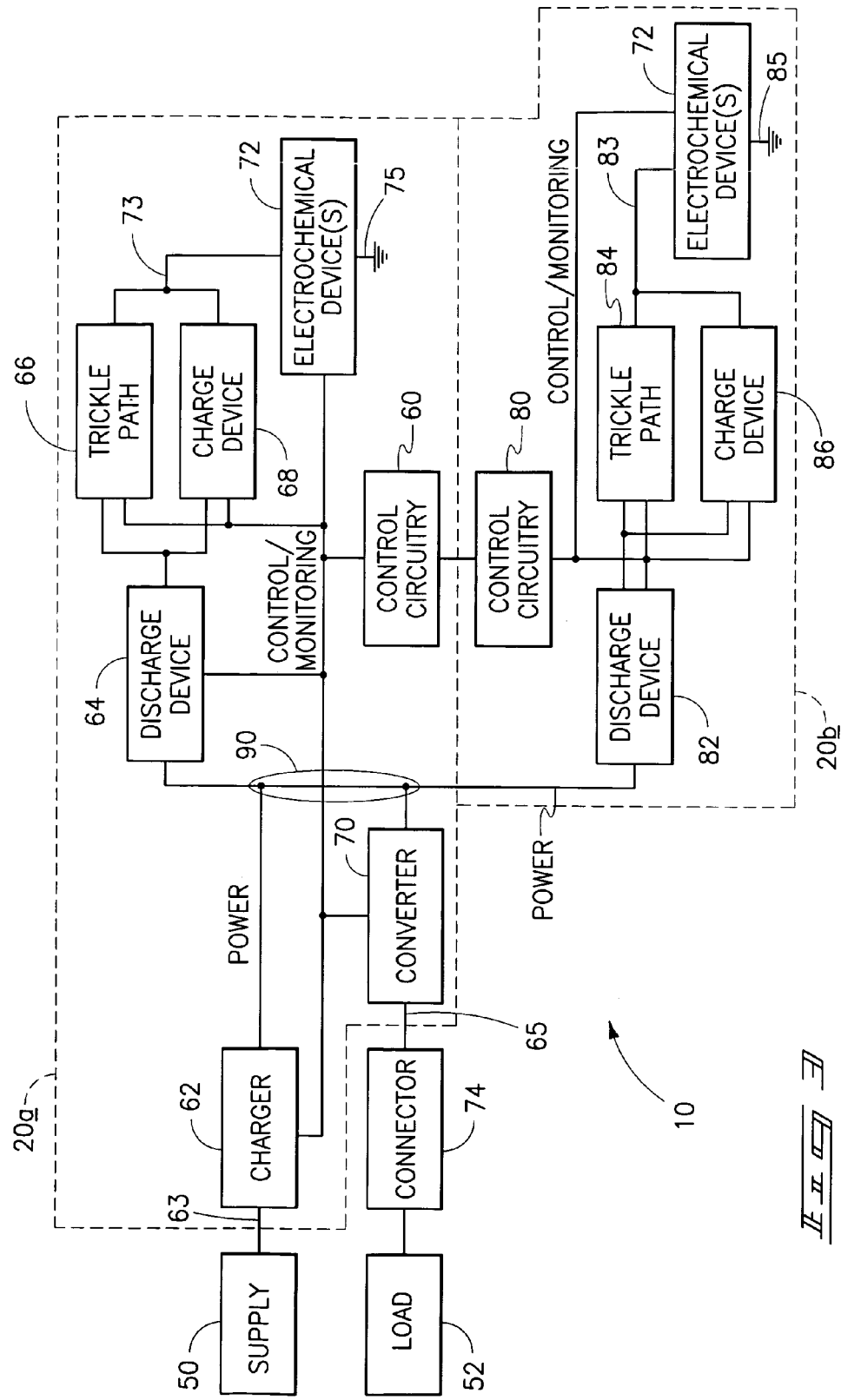
FIG. 3 is a functional block diagram illustrating exemplary components of an electrical energy power supply according to one embodiment.

Referring to FIG. 3, components and circuitry of an exemplary configuration of power supply 10 including coupled battery assemblies 20a, 20b are shown. Other embodiments of power supply 10 are possible for different applications, usage with different types of loads, etc. The depicted configuration of power supply 10 is arranged wherein battery assembly 20a is a master device and battery assembly 20b is a slave device and accordingly the battery assemblies 20a, 20b are configured differently in the described embodiment. Other arrangements are possible as mentioned previously.

The depicted embodiment of power supply 10 is configured to couple with supply 50 and/or load 52 at different moments in time. For example, when supply 50 is coupled with power supply 10, supply 50 may provide electrical energy for charging electrochemical device(s) of power supply 10 and/or provide power to load 52. When supply 50 is not present or is otherwise not providing electrical energy, power supply 10 may power load 52 using internally stored electrical energy.

In the depicted exemplary embodiment, battery assembly 20a configured as a master assembly includes control circuitry 60, a charger 62, a discharge device 64, a trickle path 66, a charge device 68, and one or more electrochemical device(s) 72. Battery assembly 20b configured as a slave assembly includes control circuitry 80, a discharge device 82, a trickle path 84, a charge device 86 and one or more electrochemical device(s) 72. As used herein, an enabled or engaged state of operation provides conduction of current through a respective circuit, and a disabled or disengaged state of operation precludes conduction of current through a respective circuit.

Referring now to battery assembly 20a, control circuitry 60 is configured to control operations of assembly 20a including charging and discharging operations of electrochemical device(s) 72 of assembly 20a. Control circuitry 60 is also configured to control operations of assembly 20b including charging and discharging operations of electrochemical device(s) 72 of assembly 20b in the exemplary embodiment. Control circuitry 60 may be configured to monitor electrical status (e.g., voltage) of one or more of device(s) 72 of assemblies 20a and/or 20b and to control at least some operations responsive thereto in one embodiment. Control circuitry 60 may be implemented as a controller configured to execute instructions (e.g., microprocessor) and/or hardware circuitry in exemplary embodiments. Additional details regarding operations of exemplary control circuitry 60 are described below.

Charger 62 is configured to implement charging operations of electrochemical devices 72 of both battery assemblies 20a, 20b. Charger 62 is configured to couple with supply 50 via a suitable coupling 63. Supply 50 may be configured as a grid, generator or other appropriate source of electrical energy (e.g., direct current). The electrical energy may be rectified if it is provided as alternating current electrical energy in one embodiment.

Discharge device 64 is coupled in series intermediate a node 90 (coupled with charger 62 and converter 70) and electrochemical device(s) 72 of assembly 20a. Discharge device 64 is controlled by control circuitry 60 and/or control circuitry 80 in the depicted embodiment to enable or disable discharging of device(s) 72 of assembly 20a in the described embodiment.

Trickle path 66 is coupled in series intermediate node 90 and device(s) 72 of assembly 20a in the illustrated embodiment. Trickle path 66 is configured to implement trickle charging of device(s) 72 as is described further below in one embodiment.

Charge device 68 may be coupled intermediate node 90 and device(s) 72 of assembly 20a in parallel with trickle path 66 as shown. When engaged or enabled, charge device 68 is configured to conduct an increased amount of current to charge device(s) 72 for charging at an increased rate compared with charging via trickle path 66. In one embodiment, control circuitry 60 and/or control circuitry 80 enable or disable individual ones of the trickle path 66 and charge device 68 as described further below. In one operational implementation, only one of trickle path 66 and charge device 68 are enabled at any given moment in time. Other embodiments are possible.

Converter 70 is configured to increase or decrease the voltage of received electrical energy corresponding to the requirements of load 52. In one embodiment, converter 70 operates as a boost converter to increase the voltage of electrical energy. According to one arrangement, converter 70 may be configured to implement different voltage adjustment operations corresponding to different loads 52 coupled with supply 10 at different moments in time as discussed further below.

Electrochemical device(s) 72 may be referred to as cells individually configured to store electrical energy for powering load 52 and may be discharged and recharged (i.e., cycled) numerous times in one embodiment. If assembly 20a comprises a plurality of electrochemical device(s) 72, the plural devices 72 may be arranged in any appropriate series and/or parallel implementation. Electrochemical device(s) 72 of assembly 20a are coupled via a positive power terminal 73 with trickle path 66 and charge device 68, and via a negative power terminal 75 to ground.

In one embodiment, electrochemical device(s) 72 may be individually configured as one or more cells which embody Saphion® technology and are available from the assignee hereof. More specifically, the cells may comprise a positive electrode, a negative electrode, and an electrolyte in ion-transfer relationship with each electrode. As used herein, the word "include," and its variants, is intended to be non-limiting, such that recitation of items in a list is not to the exclusion of other like items that may also be useful in the materials, compositions, devices, and methods described herein. A "battery" refers to an arrangement having one or more electricity-producing electrochemical cells (e.g., storage circuitry 18). Two or more electrochemical cells may be combined in parallel or series, or "stacked," so as to create a multi-cell battery. Other embodiments are possible.

Exemplary electrode active materials described herein may be used in the negative electrode, the positive electrode, or both electrodes of a cell. Preferably, the active materials are used in the positive electrode (As used herein, the terms "negative electrode" and "positive electrode" refer to the electrodes at which oxidation and reduction occur, respectively, during discharge; during charging, the sites of oxidation and reduction are reversed). The terms "preferred" and "preferably" as used herein refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments.

Electrochemical cells may include alkali metal-containing electrode active material. In one embodiment, the active material is represented by the nominal general formula (I):

$$[A_a, D_d]M_m(XY_4)_pZ_e,$$ (I)

wherein:
- (i) A is selected from the group consisting of elements from Group I of the Periodic Table, and mixtures thereof, and $0 < a \leq 9$;
- (ii) D is at least one element with a valence state of $\geq 2+$, and $0 \leq d \leq 1$;
- (iii) M includes at least one redox active element, and $1 \leq m \leq 3$;
- (iv) $XY_4$ is selected from the group consisting of $X'[O_{4-x}, Y'_x]$, $X'[O_{4-y}, Y'_{2y}]$, $X''S_4$, $[X_z''', X'_{1-z}]O_4$, and mixtures thereof, wherein:
  - (a) X' and X''' are each independently selected from the group consisting of P, As, Sb, Si, Ge, V, S, and mixtures thereof;
  - (b) X'' is selected from the group consisting of P, As, Sb, Si, Ge, V, and mixtures thereof;
  - (c) Y' is selected from the group consisting of a halogen, S, N, and mixtures thereof; and
  - (d) $0 \leq x \leq 3$, $0 \leq y \leq 2$, $0 \leq z \leq 1$, and $1 \leq p \leq 3$; and
- (v) Z is OH, a halogen, or mixtures thereof, and $0 \leq e \leq 4$;

wherein A, D, M, X, Y, Z, a, d, x, y, z, p and e are selected so as to maintain electroneutrality of the material.

The term "nominal general formula" refers to the fact that the relative proportion of atomic species may vary slightly on the order of 2 percent to 5 percent, or more typically, 1 percent to 3 percent. The composition of A, D, M, $XY_4$ and Z of general formulas (I) through (V) herein, as well as the stoichiometric values of the elements of the active material, are selected so as to maintain electroneutrality of the electrode active material. The stoichiometric values of one or more elements of the composition may take on non-integer values.

For all embodiments described herein, A is selected from the group consisting of elements from Group I of the Periodic Table, and mixtures thereof (e.g. $A_a = A_{a-a'}A'_{a'}$, wherein A and A' are each selected from the group consisting of elements from Group I of the Periodic Table and are different from one another, and $a' < a$). As referred to herein, "Group" refers to the Group numbers (i.e., columns) of the Periodic Table as defined in the current IUPAC Periodic Table. (See, e.g., U.S. Pat. No. 6,136,472, Barker et al., issued Oct. 24, 2000, incorporated by reference herein.) In addition, the recitation of a genus of elements, materials or other components, from which an individual component or mixture of components can be selected, is intended to include all possible sub-generic combinations of the listed components, and mixtures thereof.

In one embodiment, A is selected from the group consisting of Li (Lithium), Na (Sodium), K (Potassium), and mixtures thereof. A may be mixture of Li with Na, a mixture of Li with K, or a mixture of Li, Na and K. In another embodiment, A is Na, or a mixture of Na with K. In one preferred embodiment, A is Li.

A sufficient quantity (a) of moiety A should be present so as to allow all of the "redox active" elements of the moiety M (as defined herein below) to undergo oxidation/reduction. In one embodiment, $0 < a \leq 9$. In another embodiment, $0 < a \leq 2$. Unless otherwise specified, a variable described herein algebraically as equal to ("="), less than or equal to ("$\leq$"), or greater than or equal to ("≧") a number is intended to subsume values or ranges of values about equal or functionally equivalent to said number.

Removal of an amount of A from the electrode active material is accompanied by a change in oxidation state of at least one of the "redox active" elements in the active material, as defined herein below. The amount of redox active material available for oxidation/reduction in the active material determines the amount (a) of the moiety A that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

In general, the amount (a) of moiety A in the active material varies during charge/discharge. Where the active materials are synthesized for use in preparing an alkali metal-ion battery in a discharged state, such active materials are characterized by a relatively high value of "a", with a correspondingly low oxidation state of the redox active components of the active material. As the electrochemical cell is charged from its initial uncharged state, an amount (b) of moiety A is removed from the active material as described above. The resulting structure, containing less amount of the moiety A (i.e., a-b) than in the as-prepared state, and at least one of the redox active components having a higher oxidation state than in the as-prepared state, while essentially maintaining the original values of the remaining components (e.g. D, M, X, Y and Z). The active materials of this invention include such materials in their nascent state (i.e., as manufactured prior to inclusion in an electrode) and materials formed during operation of the battery (i.e., by insertion or removal of A).

For all embodiments described herein, D is at least one element having an atomic radius substantially comparable to that of the moiety being substituted (e.g. moiety M and/or moiety A). In one embodiment, D is at least one transition metal. Examples of transition metals useful herein with respect to moiety D include, without limitation, Nb (Niobium), Zr (Zirconium), Ti (Titanium), Ta (Tantalum), Mo (Molybdenum), W (Tungsten), and mixtures thereof. In another embodiment, moiety D is at least one element characterized as having a valence state of ≧2+ and an atomic radius that is substantially comparable to that of the moiety being substituted (e.g. M and/or A). With respect to moiety A, examples of such elements include, without limitation, Nb (Niobium), Mg (Magnesium) and Zr (Zirconium). Preferably, the valence or oxidation state of D ($V^D$) is greater than the valence or oxidation state of the moiety (or sum of oxidation states of the elements consisting of the moiety) being substituted for by moiety D (e.g. moiety M and/or moiety A).

While not wishing to be held to any one theory, with respect to moiety A, it is thought that by incorporating a dopant (D) into the crystal structure of the active material, wherein the amount (a) of moiety A initially present in the active material is substituted by an amount of D, the dopant will occupy sites in the active material normally occupied by A, thus substantially increasing the ionic and electrical conductivity of the active material. Such materials additionally exhibit enhanced electrical conductivity, thus reducing or eliminating the need for electrically conductive material (e.g. carbon) in the electrode. Reduction or elimination of carbonaceous materials in secondary electrochemical cells, including those disclosed herein, is desirable because of the long-term deleterious effects carbonaceous materials produce during the operation of the electrochemical cells (e.g. promotion of gas production within the electrochemical cell). Reduction or elimination of the carbonaceous material also permits insertion of a greater amount of active material, thereby increasing the electrochemical cell's capacity and energy density.

Moiety A may be partially substituted by moiety D by aliovalent or isocharge substitution, in equal or unequal stoichiometric amounts. "Isocharge substitution" refers to a substitution of one element on a given crystallographic site with an element having the same oxidation state (e.g. substitution of $Ca^{2+}$ with $Mg^{2+}$). "Aliovalent substitution" refers to a substitution of one element on a given crystallographic site with an element of a different oxidation state (e.g. substitution of $Li^+$ with $Mg^{2+}$).

For all embodiments described herein where moiety A is partially substituted by moiety D by isocharge substitution, A may be substituted by an equal stoichiometric amount of moiety D, whereby the active material is represented by the nominal general formula (II):

$$[A_{a-f}D_d]M_m(XY_4)_pZ_e, \quad (II)$$

wherein f=d.

Where moiety A of general formula (II) is partially substituted by moiety D by isocharge substitution and d≠f, then the stoichiometric amount of one or more of the other components (e.g. A, M, $XY_4$ and Z) in the active material is adjusted in order to maintain electroneutrality.

For all embodiments described herein where moiety A is partially substituted by moiety D by aliovalent substitution, moiety A may be substituted by an "oxidatively" equivalent amount of moiety D, whereby the active material is represented by the nominal general formula (III):

$$\left[A_{a-\frac{f}{V^A}}, D_{\frac{d}{V^D}}\right]M_m(XY_4)_pZ_e, \quad (III)$$

wherein f=d, $V^A$ is the oxidation state of moiety A (or sum of oxidation states of the elements consisting of the moiety A), and $V^D$ is the oxidation state of moiety D.

Where moiety A of general formula (III) is partially substituted by moiety D by aliovalent substitution and d≠f, then the stoichiometric amount of one or more of the other components (e.g. A, M, $XY_4$ and Z) in the active material is adjusted in order to maintain electroneutrality.

In one embodiment, moiety M is partially substituted by moiety D by aliovalent or isocharge substitution, in equal or unequal stoichiometric amounts. In this embodiment, d≧0, wherein moiety A may be substituted by moiety D by aliovalent or isocharge substitution, in equal or unequal stoichiometric amounts. Where moieties M and A are both partially substituted by moiety D, the elements selected for substitution for each moiety may be the same or different from one another.

For all embodiments described herein where moiety M is partially substituted by moiety D by isocharge substitution, M may be substituted by an equal stoichiometric amount of moiety D, whereby $M=[M_{m-u}D_v]$, wherein u=v. Where moiety M is partially substituted by moiety D by isocharge substitution and u≠v, then the stoichiometric amount of one or more of the other components (e.g. A, M, $XY_4$ and Z) in the active material is adjusted in order to maintain electroneutrality.

For all embodiments described herein where moiety M is partially substituted by moiety D by aliovalent substitution, moiety M may be substituted by an "oxidatively" equivalent amount of moiety D, whereby $$[M_{m-\frac{u}{V^M}}, D_{\frac{v}{V^D}}],$$

wherein u=v, $V^M$ is the oxidation state of moiety M (or sum of oxidation states of the elements consisting of the moiety M), and $V^D$ is the oxidation state of moiety D.

Where moiety M is partially substituted by moiety D by aliovalent substitution and u≠v, then the stoichiometric amount of one or more of the other components (e.g. A, M, $XY_4$ and Z) in the active material is adjusted in order to maintain electroneutrality.

In this embodiment, moiety M and (optionally) moiety A are each partially substituted by aliovalent or isocharge substitution. While not wishing to be held to any one theory, it is thought that by incorporating a dopant (D) into the crystal structure of the active material in this manner, wherein the stoichiometric values M and (optionally) A are dependent on (reduced by) the amount of dopant provided for each crystallographic site, that the dopant will occupy sites in the active material normally occupied by moiety M and (optionally) moiety A. First, where $V^D > V^A$, doping sites normally occupied by A increases the number of available or unoccupied sites for A, thus substantially increasing the ionic and electrical conductivity of the active material. Second, doping the M sites reduces the concentration of available redox active elements, thus ensuring some amount of A remains in the active material upon charge, thereby increasing the structural stability of the active material. Such materials additionally exhibit enhanced electrical conductivity, thus reducing or eliminating the need for electrically conductive material in the electrode.

In all embodiments described herein, moiety M is at least one redox active element. As used herein, the term "redox active element" includes those elements characterized as being capable of undergoing oxidation/reduction to another oxidation state when the electrochemical cell is operating under normal operating conditions. As used herein, the term "normal operating conditions" refers to the intended voltage at which the cell is charged, which, in turn, depends on the materials used to construct the cell.

Redox active elements useful herein with respect to moiety M include, without limitation, elements from Groups 4 through 11 of the Periodic Table, as well as select non-transition metals, including, without limitation, Ti (Titanium), V (Vanadium), Cr (Chromium), Mn (Manganese), Fe (Iron), Co (Cobalt), Ni (Nickel), Cu (Copper), Nb (Niobium) Mo (Molybdenum), Ru (Ruthenium), Rh (Rhodium), Pd (Palladium), Os (Osmium), Ir (Iridium), Pt (Platinum), Au (Gold), Si (Silicon), Sn (Tin), Pb (Lead), and mixtures thereof. Also, "include," and its variants, is intended to be non-limiting, such that recitation of items in a list is not to the exclusion of other like items that may also be useful in the materials, compositions, devices, and methods of this invention.

In one embodiment, moiety M is a redox active element. In one subembodiment, M is a redox active element selected from the group consisting of $Ti^{2+}$, $V^{2+}$, $C^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$. In another subembodiment, M is a redox active element selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, and $Nb^{3+}$.

In another embodiment, moiety M is a mixture of redox active elements or a mixture of at least one redox active element and at least one non-redox active element. As referred to herein, "non-redox active elements" include elements that are capable of forming stable active materials, and do not undergo oxidation/reduction when the electrode active material is operating under normal operating conditions.

Among the non-redox active elements useful herein include, without limitation, those selected from Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (Zinc) and Cd (Cadmium); Group 13 elements, particularly B (Boron), Al (Aluminum), Ga (Gallium), In (Indium), Tl (Thallium); Group 14 elements, particularly C (Carbon) and Ge (Germanium), Group 15 elements, particularly As (Arsenic), Sb (Antimony), and Bi (Bismuth); Group 16 elements, particularly Te (Tellurium); and mixtures thereof.

In one embodiment, $M=MI_nMII_o$, wherein $0<o+n \leq 3$ and each of o and n is greater than zero (0<o,n), wherein MI and MII are each independently selected from the group consisting of redox active elements and non-redox active elements, wherein at least one of MI and MII is redox active. MI may be partially substituted with MII by isocharge or aliovalent substitution, in equal or unequal stoichiometric amounts.

For all embodiments described herein where MI is partially substituted by MII by isocharge substitution, MI may be substituted by an equal stoichiometric amount of MII, whereby $M=MI_{n-o}MII_o$. Where MI is partially substituted by MII by isocharge substitution and the stoichiometric amount of MI is not equal to the amount of MII, whereby $M=MI_{n-o}MII_p$ and o≠p, then the stoichiometric amount of one or more of the other components (e.g. A, D, $XY_4$ and Z) in the active material is adjusted in order to maintain electroneutrality.

For all embodiments described herein where MI is partially substituted by MII by aliovalent substitution and an equal amount of MI is substituted by an equal amount of MII, whereby $M=MI_{n-o}MII_o$, then the stoichiometric amount of one or more of the other components (e.g. A, D, $XY_4$ and Z) in the active material is adjusted in order to maintain electroneutrality. However, MI may be partially substituted by MII by aliovalent substitution by substituting an "oxidatively" equivalent amount of MII for MI, whereby $$M = MI_{n-\frac{o}{V^{MI}}} MII_{\frac{o}{V^{MII}}},$$

wherein $V^{MI}$ is the oxidation state of MI, and $V^{MII}$ is the oxidation state of MII.

In one subembodiment, MI is selected from the group consisting of Ti, V, Cr, Mn, Fe, Co, Ni, Cu, Mo, Si, Pb, Mo, Nb, and mixtures thereof, and MII is selected from the group consisting of Be, Mg, Ca, Sr, Ba, Sc, Y, Zn, Cd, B, Al, Ga, In, C, Ge, and mixtures thereof. In this subembodiment, MI may be substituted by MII by isocharge substitution or aliovalent substitution.

In another subembodiment, MI is partially substituted by MII by isocharge substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is selected from the group specified immediately above, and MII is selected from the group consisting of $Be^{2+}$, $Mg^{2+}$, $Ca^{2+}$, $Sr^{2+}$, $Ba^{2+}$, and mixtures thereof. In another aspect of this subembodiment, MI is selected from the group specified above, and MII is selected from the group consisting of $Zn^{2+}$, $Cd^{2+}$, and mixtures thereof. In yet another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof.

In another embodiment, MI is partially substituted by MII by aliovalent substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof. In another aspect of this subembodiment, MI is a 2+ oxidation state redox active element selected from the group specified immediately above, and MII is selected from the group consisting of alkali metals, $Cu^{1+}$, $Ag^{1+}$ and mixtures thereof. In another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is a 3+ oxidation state redox active element selected from the group specified immediately above, and MII is selected from the group consisting of alkali metals, $Cu^{1+}$, $Ag^{1+}$ and mixtures thereof.

In another embodiment, $M=M1_qM2_rM3_s$, wherein:

(a) M1 is a redox active element with a 2+ oxidation state;

(b) M2 is selected from the group consisting of redox and non-redox active elements with a 1+ oxidation state;

(c) M3 is selected from the group consisting of redox and non-redox active elements with a 3+ oxidation state; and (d) at least one of p, q and r is greater than 0, and at least one of M1, M2, and M3 is redox active.

In one subembodiment, M1 is substituted by an equal amount of M2 and/or M3, whereby $q=q-(r+s)$. In this subembodiment, then the stoichiometric amount of one or more of the other components (e.g. A, $XY_4$, Z) in the active material is adjusted in order to maintain electroneutrality.

In another subembodiment, $M^1$ is substituted by an "oxidatively" equivalent amount of $M^2$ and/or $M^3$, whereby $$M = M1_{q-\frac{r}{V^{M1}}-\frac{s}{V^{M1}}} M2_{\frac{r}{V^{M2}}} M3_{\frac{s}{V^{M3}}},$$

wherein $V^{M1}$ is the oxidation state of M1, $V^{M2}$ is the oxidation state of M2, and $V^{M3}$ is the oxidation state of M3.

In one subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$, and mixtures thereof; and M3 is selected from the group consisting of $Sc^{3+}$, $U^{3+}$, $B^{3+}$, $Al^{3+}$, $Ga^{3+}$, $In^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In all embodiments described herein, moiety $XY_4$ is a polyanion selected from the group consisting of $X'[O_{4-x},Y'_x]$, $X'[O_{4-y},Y'_{2y}]$, $X''S_4$, $[X_z''',X'_{1-z}]O_4$, and mixtures thereof, wherein:

(a) X' and X''' are each independently selected from the group consisting of P, As, Sb, Si, Ge, V, S, and mixtures thereof;

(b) X'' is selected from the group consisting of P, As, Sb, Si, Ge, V, and mixtures thereof;

(c) Y' is selected from the group consisting of a halogen, S, N, and mixtures thereof; and (d) $0 \leq x \leq 3$, $0 \leq y \leq 2$, and $0 \leq z \leq 1$.

In one embodiment, $1 \leq p \leq 3$. In one subembodiment, $p=1$. In another subembodiment, $p=3$.

In one embodiment, $XY_4$ is selected from the group consisting of $X'O_{4-x}Y'_x$, $X'O_{4-y}Y'_{2y}$, and mixtures thereof, and x and y are both 0. Stated otherwise, $XY_4$ is a polyanion selected from the group consisting of $PO_4$, $SiO_4$, $GeO_4$, $VO_4$, $AsO_4$, $SbO_4$, $SO_4$, and mixtures thereof. Preferably, $XY_4$ is $PO_4$ (a phosphate group) or a mixture of $PO_4$ with another anion of the above-noted group (i.e., where X' is not P, Y' is not O, or both, as defined above). In one embodiment, $XY_4$ includes about 80% or more phosphate and up to about 20% of one or more of the above-noted anions.

In another embodiment, $XY_4$ is selected from the group consisting of $X'[O_{4-x},Y'_x]$, $X'[O_{4-y},Y'_{2y}]$, and mixtures thereof, and $0<x \leq 3$ and $0<y \leq 2$, wherein a portion of the oxygen (O) in the $XY_4$ moiety is substituted with a halogen, S, N, or a mixture thereof.

In all embodiments described herein, moiety Z (when provided) is selected from the group consisting of OH (Hydroxyl), a halogen, or mixtures thereof. In one embodiment, Z is selected from the group consisting of OH, F (Fluorine), Cl (Chlorine), Br (Bromine), and mixtures thereof. In another embodiment, Z is OH. In another embodiment, Z is F, or a mixture of F with OH, Cl, or Br. Where the moiety Z is incorporated into the active material, the active material may not take on a NASICON or olivine structural where p=3 or d=1, respectively. It is quite normal for the symmetry to be reduced with incorporation of, for example, halogens.

The composition of the electrode active material, as well as the stoichiometric values of the elements of the composition, are selected so as to maintain electroneutrality of the electrode active material. The stoichiometric values of one or more elements of the composition may take on non-integer values. Preferably, the $XY_4$ moiety is, as a unit moiety, an anion having a charge of −2, −3, or −4, depending on the selection of X', X'', X'''Y', and x and y. When $XY_4$ is a mixture of polyanions such as the preferred phosphate/phosphate substitutes discussed above, the net charge on the $XY_4$ anion may take on non-integer values, depending on the charge and composition of the individual groups $XY_4$ in the mixture.

In one particular embodiment, the electrode active material has an orthorhombic-dipyramidal crystal structure and belongs to the space group Pbnm (e.g. an olivine or triphylite material), and is represented by the nominal general formula (II):

$$[A_a, D_d]M_m XY_4 Z_e, \quad (IV)$$

wherein:
(a) the moieties A, D, M, X, Y and Z are as defined herein above;
(b) $0 < a \leq 2$, $0 \leq d \leq 1$, $1 < m \leq 2$, and $0 < e \leq 1$; and
(c) the components of the moieties A, D, M, X, Y, and Z, as well as the values for a, d, m and e, are selected so as to maintain electroneutrality of the compound.

In one particular subembodiment, A of general formula (IV) is Li, $0.5 < a \leq 1.5$, $M = MI_{n-p}MII_o$, wherein $o = p$, $0.5 < n \leq 1.5$, $0 < o \leq 0.1$, MI is a 2+ oxidation state redox active element selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$ (preferably $Fe^{2+}$), MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof (preferably $Mg^{2+}$ or $Ca^{2+}$), $XY_4 = PO_4$, and $e = 0$.

In another particular subembodiment, A of general formula (IV) is Li, $0 < a \leq 1$, $M = MI_{n-p}MII_o$, wherein $o = p$, $0 < o \leq 0.5$, MI is $Fe^{2+}$, MII is selected from the group consisting of $Be^{2+}$, $Mg^{2+}$, $Ca^{2+}$, $Sr^{2+}$, $Ba^{2+}$, and mixtures thereof (preferably $Mg^{2+}$ or $Ca^{2+}$), $XY_4 = PO_4$, and $d,e = 0$.

In another particular embodiment, the electrode active material has a rhombohedral (space group R-3) or monoclinic (space group Pbcn) NASICON structure, and is represented by the nominal general formula (V):

$$[A_a, D_d]M_m(XY_4)_3 Z_e, \quad (V)$$

wherein:
(a) the moieties A, D, M, X, Y and Z are as defined herein above;
(b) $0 < a \leq 5$, $0 \leq d \leq 1$; $1 < m \leq 3$, and $0 < e \leq 4$; and
(c) the components of the moieties A, D, M, X, Y, and Z, as well as the values for a, d, m and e, are selected so as to maintain electroneutrality of the compound.

In one particular subembodiment, A of general formula (V) is Li, M is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof (preferably $V^{3+}$), $XY_4 = PO_4$, and $e = 0$. In another particular subembodiment, A of general formula (V) is Li, M is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof (preferably $V^{3+}$), $XY_4 = PO_4$, and $d,e = 0$.

The following applications describe additional details of active materials and method of forming active materials and compounds according to exemplary aspects: International Publication No. WO01/54212, entitled "Lithium-Based Electrochemically Active Materials And Preparation Thereof," published Jul. 26, 2001, listing Jeremy Barker and M. Yazid Saidi as inventors; International Publication No. WO98/12761, entitled "Lithium-Containing, Lithium-Intercalating Phosphates And Their Use As The Positive Or Negative Electrode Material In A Lithium Secondary Battery," published Mar. 26, 1998, listing M. Yazid Saidi and Jeremy Barker as inventors; International Publication No. WO00/01024, entitled "Lithium-Containing Silicon/Phosphates, Method Of Preparation, And Uses Thereof," published Jan. 6, 2000, listing Jeremy Barker and M. Yazid Saidi as inventors; International Publication No. WO00/31812, entitled "Lithium-Based Phosphates For Use In Lithium Ion Batteries And Method Of Preparation," published Jun. 2, 2000, listing Jeremy Barker and M. Yazid Saidi as inventors; International Publication No. WO00/57505, entitled "Lithium-Containing Phosphate Active Materials," published Sep. 28, 2000, listing Jeremy Barker as inventor; International Publication No. WO02/44084, entitled "Methods Of Making Lithium Metal Compounds Useful As Cathode Active Materials," published Jun. 6, 2002, listing Jeremy Barker and M. Yazid Saidi as inventors; International Publication No. WO03/085757, entitled "Batteries Comprising Alkali-Transition Metal Phosphates And Preferred Electrolytes," published Oct. 16, 2003, listing M. Yazid Saidi and Haitao Huang as inventors; International Publication No. WO03/085771, entitled "Alkali-iron-Cobalt Phosphates And Related Electrode Active Materials," published Oct. 16, 2003, listing M. Yazid Saidi and Haitao Huang as inventors; International Publication No. WO03/088383, entitled "Alkali-Transition Metal Phosphates Having A+3 Valence Non-Transition Element And Related Electrode Active Materials," published Oct. 23, 2003, listing M. Yazid Saidi and Haitao Huang as inventors; U.S. Pat. No. 6,528,033, issued Mar. 4, 2003, entitled "Method Of Making Lithium Containing Materials," listing Jeremy Barker, M. Yazid Saidi, and Jeffrey Swoyer as inventors; U.S. Pat. No. 6,387,568, issued May 14, 2002, entitled "Lithium Metal Flurophosphate Materials And Preparation Thereof," listing Jeremy Barker, M. Yazid Saidi, and Jeffrey Swoyer as inventors; U.S. Publication No. 2003/0027049, published Feb. 2, 2003, entitled "Alkali/Transition Metal Halo-And Hydroxyl-Phosphates And Related Electrode Materials," listing Jeremy Barker, M. Yazid Saidi, and Jeffrey Swoyer as inventors; U.S. Publication No. 2002/0192553, published Dec. 19, 2002, entitled "Sodium Ion Batteries," listing Jeremy Barker, M. Yazid Saidi, and Jeffrey Swoyer as inventors; U.S. Publication No. 2003/0170542, published Sep. 11, 2003, entitled "Alkali Transition Metal Phosphates And Related Electrode Active Materials," listing Jeremy Barker, M. Yazid Saidi, and Jeffrey Swoyer as inventors; and U.S. patent application Ser. No. 09/484,799, entitled "Lithium-Based Active Materials and Preparation Thereof", listing Jeremy Barker as an inventor, filed Jan. 18, 2000, now U.S. Publication No. 2003/0129492, the teachings of all of which are incorporated herein by reference.

According to one aspect for forming an electrode, the active material may be combined with a polymeric binder (e.g. polyvinylidene difluoride (PVdF) and hexafluoropropylene (HFP)) in order to form a cohesive mixture. The mixture is then placed in electrical communication with a current collector which, in turn, provides electrical communication between the electrode and an external load. The mixture may be formed or laminated onto the current collector, or an electrode film may be formed from the mixture wherein the current collector is embedded in the film. Suitable current collectors include reticulated or foiled metals (e.g. aluminum, copper and the like). An electrically conductive diluent or agent (e.g. a carbon such as carbon black and the like) may be added to the mixture so as to increase the electrical conductivity of the electrode. In one embodiment, the electrode material is pressed onto or about the current collector, thus eliminating the need for the polymeric binder. In one embodiment, the electrode contains 5 to 30% by weight electrically conductive agent, 3 to 20% by weight binder, and the remainder being the electrode active material.

To form an electrochemical cell, a solid electrolyte or an electrolyte-permeable separator is interposed between the electrode and a counter-electrode. In one embodiment, the electrolyte contains a solvent selected from the group consisting of the electrolyte comprises a lithium salt and a solvent selected from the group consisting of dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, and mixtures thereof; and 5 to 65% by weight of an alkali metal salt. Preferred solvent combinations include EC/DMC, EC/DEC, EC/DPC and EC/EMC. In one embodiment, the counter-electrode contains an intercalation active material selected from the group consisting of a transition metal oxide, a metal chalcogenide, carbon (e.g. graphite), and mixtures thereof. Counter electrodes, electrolyte compositions, and methods for making the same, among those useful herein, are described in U.S. Pat. No. 5,700,298, Shi et al., issued Dec. 23, 1997; U.S. Pat. No. 5,830,602, Barker et al., issued Nov. 3, 1998; U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

Additional details of electrochemical cells composed of electrodes (including polymer-type stacked cells and cylindrical-type cells), electrolytes and other materials, among those useful herein, are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; U.S. Pat. No. 5,869,208, Miyasaka, issued Feb. 9, 1999; U.S. Pat. No. 5,882,821, Miyasaka, issued Mar. 16, 1999; U.S. Pat. No. 5,616,436, Sonobe. et al., issued Apr. 1, 1997; and U.S. Pat. No. 6,306,215, Larkin, issued Oct. 23, 2001.

In the described exemplary arrangement of supply 10, individual ones of battery assemblies 20a, 20b include four devices 72 individually comprising an electrochemical cell arranged in series with the other devices 72 of the respective assembly 20a, 20b. Individual cells configured using the above-described electrode active materials may provide a voltage of 3.7 Volts in a substantially charged state.

Connector 74 operates to provide electrical energy (e.g., from supply 50 or electrochemical device(s) 72) to load 52. In one embodiment, different configurations of connector 74 are available and a specific one is selected and coupled with supply 10 corresponding to load 52 to be powered at a given moment in time. For example, connector 74 may control operations of converter 70 corresponding to load 52 (e.g., connector 74 operates to control the voltage of the electrical energy outputted from converter 70 to load 52 corresponding to the operational voltage of load 52). Details regarding an exemplary connector 74 are described in U.S. Pat. No. 5,347,211, the teachings of which are incorporated by reference. Different configurations of connector 74 may be provided having different resistor values which are used to control the output voltages of converter 70 corresponding to respective different loads 52 utilizing different voltages. For example, a Notebook Power Port cable manufactured by Sinbon Electronics Company may be used to connect power supply 10 to an AC source as well as load 52. A plurality of tips available from Mobility Electronics Inc. may be used intermediate the cable and the power supply 10 to specify the appropriate resistance corresponding to the configuration of the load 52 being powered. Further exemplary details of controlling the output voltage are described below.

Additional exemplary details regarding possible embodiments of charger 62, converter 70 and connector 74 are described in a U.S. patent application Ser. No. 10/072,827, filed Feb. 8, 2002, now U.S. Pat. No. 6,667,599 issued Dec. 23, 2003, entitled "Power Supply Apparatuses and Method of Supplying Electrical Energy," listing Lawrence Stone et al. as inventors, the teachings of which are incorporated by reference herein.

Control circuitry 80 is configured to control operations of assemblies 20a and/or 20b including operations with respect to charging and discharging of device(s) 72 of assembly 20b. Further, control circuitry 80 is configured to monitor electrical status (e.g., voltage) of one or more of device(s) 72 of assembly 20b and to implement at least some control operations responsive to the monitoring. Control circuitry 80 may be implemented as a controller configured to execute instructions (e.g., microprocessor) and/or hardware circuitry in exemplary embodiments. Additional details regarding operations of control circuitry 80 are described below. Control circuitry 80 may also be configured to control operations (e.g., charge and/or discharge) of assembly 20a.

Discharge device 82 is coupled in series intermediate node 90 and electrochemical device(s) 72 of assembly 20b. Discharge device 64 is controlled by control circuits 60 and/or 80 in the described embodiment to enable or disable discharging of device(s) 72 of assembly 20b in the described embodiment.

Trickle path 84 is coupled in series intermediate node 90 and device(s) 72 of assembly 20b in the illustrated embodiment. When enabled, trickle path 84 is configured to implement trickle charging of device(s) 72 of assembly 20b.

Charge device 86 may be coupled intermediate node 90 and device(s) 72 of assembly 20b and in parallel with trickle path 84 as shown. When engaged or enabled, charge device 86 is configured to conduct an increased amount of current to charge device(s) 72 compared with trickle path 84. In one embodiment, control circuits 60 and/or 80 enable or disable individual ones of the trickle path 84 and charge device 86 as described further below. In one operational implementation, only one of trickle path 84 and charge device 86 are enabled at any given moment in time. Other embodiments are possible.

Electrochemical device(s) 72 of assembly 20b may be configured similarly to the device(s) 72 of assembly 20a in one embodiment. Electrochemical device(s) 72 of assembly 20b are coupled via a positive power terminal 83 with trickle path 84 and charge device 86, and via a negative power terminal 85 to ground.

Power supply 10 operates in different modes of operation corresponding to the presence or absence of electrical energy from supply 50.

Initially, the discussion proceeds with respect to exemplary operations when electrical energy from supply 50 is absent and thereafter exemplary details of operations of supply 10 in the presence of electrical energy from supply 50 are discussed.

When no electrical energy from supply 50 is available, electrical energy stored within device(s) 72 of battery assemblies 20a and/or 20b is used to power load 52. Whether device(s) 72 of one or both of assemblies 20a, 20b provide electrical energy corresponds to a state of charge (e.g., voltage) of the device(s) 72 of assemblies 20a, 20b. For example, supply 10 is configured to avoid conduction of excessive currents due to imbalances of the voltages provided by device(s) 72 of assemblies 20a, 20b. Upon coupling of assemblies 20a, 20b with one another, the voltages provided by device(s) 72 of the respective assemblies 20a, 20b are compared with another according to one embodiment. A voltage provided at the positive power terminal 73 of assembly 20a may be compared with a voltage provided at the positive power terminal 83 of assembly 20b to implement the comparison. Responsive to the comparison, control circuits 60 and/or 80 may control discharge devices 64, 82, trickle paths 66, 84 and charge devices 68, 86 to implement desired charging and/or discharging. As used herein, voltages of assemblies 20a, 20b may refer to voltages present at positive power terminals 73, 83, respectively.

Exemplary operations are now discussed with respect to an absence of electrical energy from a supply 50 and the voltages of assemblies 20a, 20b being out of convergence (i.e., the voltages of assemblies 20a, 20b are sufficiently imbalanced wherein excessive currents may occur). In one embodiment, convergence may be defined as the difference between the voltages of assemblies 20a, 20b being equal to or less than approximately 200 mV.

The example is discussed with the assumption that the voltage of assembly 20b is greater than the voltage of assembly 20a (also referred to as B>A or BoverA). In such an arrangement, control circuitry 60 operates to control discharge device 64 to be engaged, trickle path 66 to be engaged, and charge device 68 to be disengaged. Further, control circuitry 60, 80 operates to control discharge device 82 to be engaged, charge device 86 to be engaged and trickle path 84 to be disengaged. This operation permits device(s) of assembly 20b to provide electrical energy to a load 52 (if connected) as well as provide electrical energy for charging device(s) 72 of assembly 20a via trickle path 66. Trickle path 66 may include sufficient series resistance to prevent conduction of overage currents which may damage components of supply 10 and/or excessively drain assembly 20b.

If the voltages of subassemblies 20a, 20b are sufficiently converged and there is an absence of electrical energy from supply 50, then control circuitry 60 may control discharge device 64 to be engaged, trickle path 66 to be disengaged, and charge device 68 to be engaged. Further, control circuitry 60, 80 operates to maintain discharge device 82 engaged, charge device 86 engaged and trickle path 84 disengaged. This operation permits device(s) of assemblies 20a, 20b to provide electrical energy to a load 52 (if connected to supply 10) and fully converge the voltages of assemblies 20a, 20b.

In addition, during the absence of electrical energy from supply 50, a charge switching device 106 (e.g., Q23 of the exemplary embodiment of FIG. 5B) of charger 62 may be disabled to disconnect node 90 from terminals of coupling 63 configured to couple with supply 50. Converter 70 is also provided in an enabled operational mode to convert the voltage of electrical energy present at node 90 to a desired voltage prior to providing the electrical energy to load 52.

Exemplary operations are also discussed during the presence of electrical energy from a supply 50 and the voltages of assemblies 20a, 20b being out of convergence. When present, electrical energy from supply 50 may be provided to load 52 (e.g., via circuitry illustrated in FIG. 8 in one arrangement). The example is further discussed with the assumption that the voltage of assembly 20b is greater than the voltage of assembly 20a. In such a condition, control circuitry 60 and/or 80 operates to control discharge device 64 to be engaged, trickle path 66 to be disengaged, and charge device 68 to be engaged. Further, control circuitry 60 and/or 80 operates to control discharge device 82 to be disengaged, charge device 86 to be engaged and trickle path 84 to be disengaged. This operation enables charging of device(s) 72 of assembly 20a using electrical energy from supply 50 and isolates device(s) of assembly 20b from node 90. Further, supply 50 may provide electrical energy to load 52 (if present).

If the voltages of subassemblies 20a, 20b are sufficiently converged, then control circuitry 60 and/or 80 may control discharge device 64 to be engaged, trickle path 66 to be disengaged, and charge device 68 to be engaged. Further, control circuitry 60 and/or 80 operates to maintain discharge device 82 engaged, charge device 86 engaged and trickle path 84 disengaged. This operation permits electrical energy of supply 50 to charge device(s) 72 of assemblies 20a, 20b and fully converge the voltages of assemblies 20a, 20b.

In addition, during the presence of electrical energy from supply 50, charge switching device 106 of charger 62 may be enabled to connect node 90 with supply 50 to provide the electrical energy to charge device(s) 72 of assemblies 20a, 20b. Converter 70 is also provided in a disabled operational mode wherein no voltage conversion is provided inasmuch as supply 50 may provide operational electrical energy to load 52 in the described exemplary embodiment.

In one embodiment, the operations of discharge devices 64, 82, trickle paths 66, 84, and charge devices 68, 86 may be reversed with respect to the operations described above if the voltages of assemblies 20a, 20b are not converged and the voltage of assembly 20a exceeds the voltage of assembly 20b.

According to an operational aspect wherein electrical energy is absent from supply 50, one of the assemblies 20a, 20b may be charged using electrical energy from device(s) 72 of the other of assemblies 20a, 20b during an absence of the electrical energy from supply 50 as mentioned above.

Also, in at least one operational aspect, when electrical energy from supply 50 is present, control circuitry 60 and/or 80 may control charging of only one of assemblies 20a, 20b at a first moment in time using electrical energy from supply 50 (e.g., the assembly having the lower voltage), and both assemblies 20a, 20b may be charged using the electrical energy from supply 50 at another moment in time (e.g., the voltages of the assemblies 20a, 20b are converged).

According to an additional aspect, discharging of the device(s) 72 of one of assemblies 20a, 20b is disabled during the charging of device(s) 72 of the other of assemblies 20a, 20b using electrical energy from supply 50. According to another operational aspect, charging of device(s) 72 of one of the assemblies 20a, 20b using electrical energy from the other of assemblies 20a, 20b is disabled if electrical energy from supply 50 becomes present or is otherwise provided during charging using electrical energy from the other of assemblies 20a, 20b.

Upon mechanical coupling of housings 24a, 24b, a power terminal 92 of assembly 20a and a power terminal 94 of assembly 20b are commonly electrically coupled at node 90. If a supply is present, electrical energy from supply 50 may be provided to charge device(s) 72 of only one of assemblies 20a, 20b if the one assembly has a voltage less than the other assembly and with the power terminals 92, 94 in electrical communication. As mentioned above, control circuitry 60 and/or 80 may electrically isolate device(s) 72 of the other assembly during the charging by controlling one or more of discharge devices 64, 82, trickle paths 66, 84, and charge devices 68, 86.

After convergence, control circuitry 60 and/or 80 may control one or more of discharge devices 64, 82, trickle paths 66, 84, and charge devices 68, 86 to directly electrically couple device(s) 72 of both assemblies 20a, 20b for charging using electrical energy from supply 50 or providing electrical energy to load 52. The direct electrical coupling responsive to convergence of the voltages of assemblies 20a, 20b may be referred to as substantially direct coupling without significant resistance provided therebetween. For example, inherent resistances of devices 64, 68, 82, 86 may be present in the direct electrical coupling without significant resistance (e.g., present in the discharge paths) provided between the positive power terminals 73, 83 during voltage convergence. In one embodiment, it is desired to minimize resistance between respective device(s) 72 of assemblies 20a, 20b once convergence has occurred.

One possible implementation of components and circuitry of power supply 10 is represented in the circuit schematics of FIGS. 4-10. FIGS. 4-8 provide exemplary circuitry of battery assembly 20a and FIGS. 9-10 provide exemplary circuitry of battery assembly 20b. Additional details of the exemplary schematics are provided in respective Tables below. Other configurations, components and/or circuitry of power supply 10 are possible.

Referring initially to FIGS. 4A-4B, an exemplary embodiment of a portion of control circuitry 60 of battery assembly 20a is shown. The depicted control circuitry 60 comprises hardware control circuitry 100 and a controller 102 configured to execute ordered instructions (e.g., software or firmware provided using any appropriate medium such as volatile or non-volatile memory, disk, etc.). Connector J1 (e.g., corresponding to connector 42 of FIG. 2) is configured to couple with connector J1 (e.g., corresponding to connector 44 of FIG. 2) of battery assembly 20b shown in FIG. 10. For example, upon mechanical coupling of assemblies 20a, 20b, electrical connection of connector J1 of FIG. 4A and connector J1 of FIG. 10 is provided. Node Vcell indicates a power node corresponding to node 90 coupling electrical energy from device(s) 72 from coupled assemblies 20a, 20b when appropriate for charging and/or discharging. Connector J2 is configured to couple with connector J3 of the circuitry of FIG. 8.

Nodes VAC1 and VSNS1 correspond to input power received from a supply 50. Node VOUT1 corresponds to output power applied to a load 52. Node Vpower1 corresponds to electrical energy received from the supply 50 and provided to charger 62.

Node ConnPresC is used to indicate the electrical coupling of assemblies 20a, 20b and node NBVID may be tied to a resistor of connector 74 described above to set the regulation voltage of converter 70 corresponding to the respective load 52 being powered. Node BoostOn is pulled low responsive to a fault condition (e.g., overvoltage) or the presence of electrical energy from supply 50. Controller 102 may assert node BoostDis for a predetermined period of time once BoostOn is pulled low to allow time to clear a fault. Node ACPRESL may be asserted high while electrical energy is present from supply 50.

Nodes VCASNS and BVSNS correspond to the voltages of the respective assemblies 20a, 20b. Further, controller 102 may monitor the voltages of assemblies 20a, 20b via respective nodes CM1, CM2, CM3, CM4 and VSenseB.

Comparator 104 of hardware 100 may assert a logic high control signal on node BOverA responsive to the voltage of assembly 20b exceeding the voltage of assembly 20a. Assertion of a signal upon node BOverA enables the trickle path 66 and disables charge device 68 in the absence of electrical energy from supply 50. The discharge device 64 is also enabled during trickle charging of device(s) 72 of assembly 20a. Further, with respect to assembly 20b, discharge device 82 is enabled, charge device 86 is enabled, and trickle path 84 is disabled during trickle charging of assembly 20a.

Responsive to the output upon node BOverA, node TRICKLE being low and the absence of electrical energy from supply 50, the trickle path 84 is selectively enabled and charge device 86 is disabled to permit trickle charging of device(s) 72 of assembly 20b when the voltage of assembly 20a is higher than assembly 20b. Discharge device 82 may also be enabled during the trickle charging. Further, with respect to assembly 20a, discharge device 64 is enabled, charge device 68 is enabled, and trickle path 66 is disabled during trickle charging of assembly 20b.

Controller 102 may assert a signal on node CHGAONLY to implement charging only of assembly 20a responsive to the voltage of assembly 20b exceeding the voltage of assembly 20a. Controller 102 may assert a signal on node CHGBONLY to implement only charging of assembly 20b responsive to the voltage of assembly 20a exceeding the voltage of assembly 20b. The control signals on nodes CHGAONLY and CHGBONLY are only asserted while supply 50 provides electrical energy in the described exemplary embodiment.

Assertion of CHGAONLY disables trickle path 66 while enabling charge device 68 while assertion of CHGBONLY disables trickle path 84 while enabling charge device 86. Discharge device 64 is enabled and discharge device 82 is disabled during charging of assembly 20a while CHGAONLY is asserted. Discharge device 82 is enabled and discharge device 64 is disabled during charging of assembly 20b while CHGBONLY is asserted.

Referring to FIGS. 5A-5B, an exemplary configuration of charger 62 is shown. Node VPower1 conducts electrical energy to charge electrochemical device(s) 72. Charge switching device 106 is enabled responsive to the presence of electrical energy from supply 50 and disabled in the absence of electrical energy from supply 50.

Figure 6B:
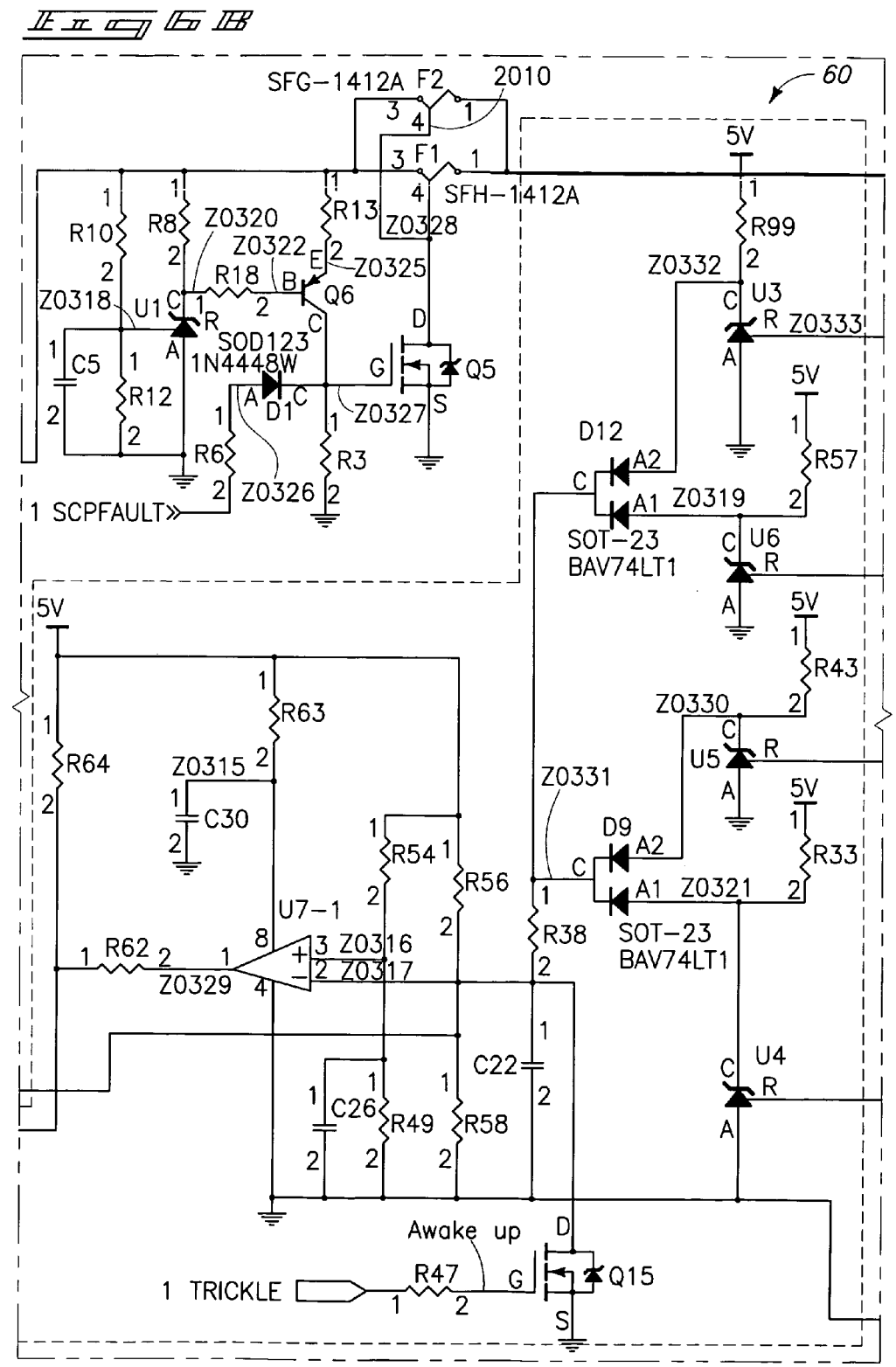
Figure 6C:
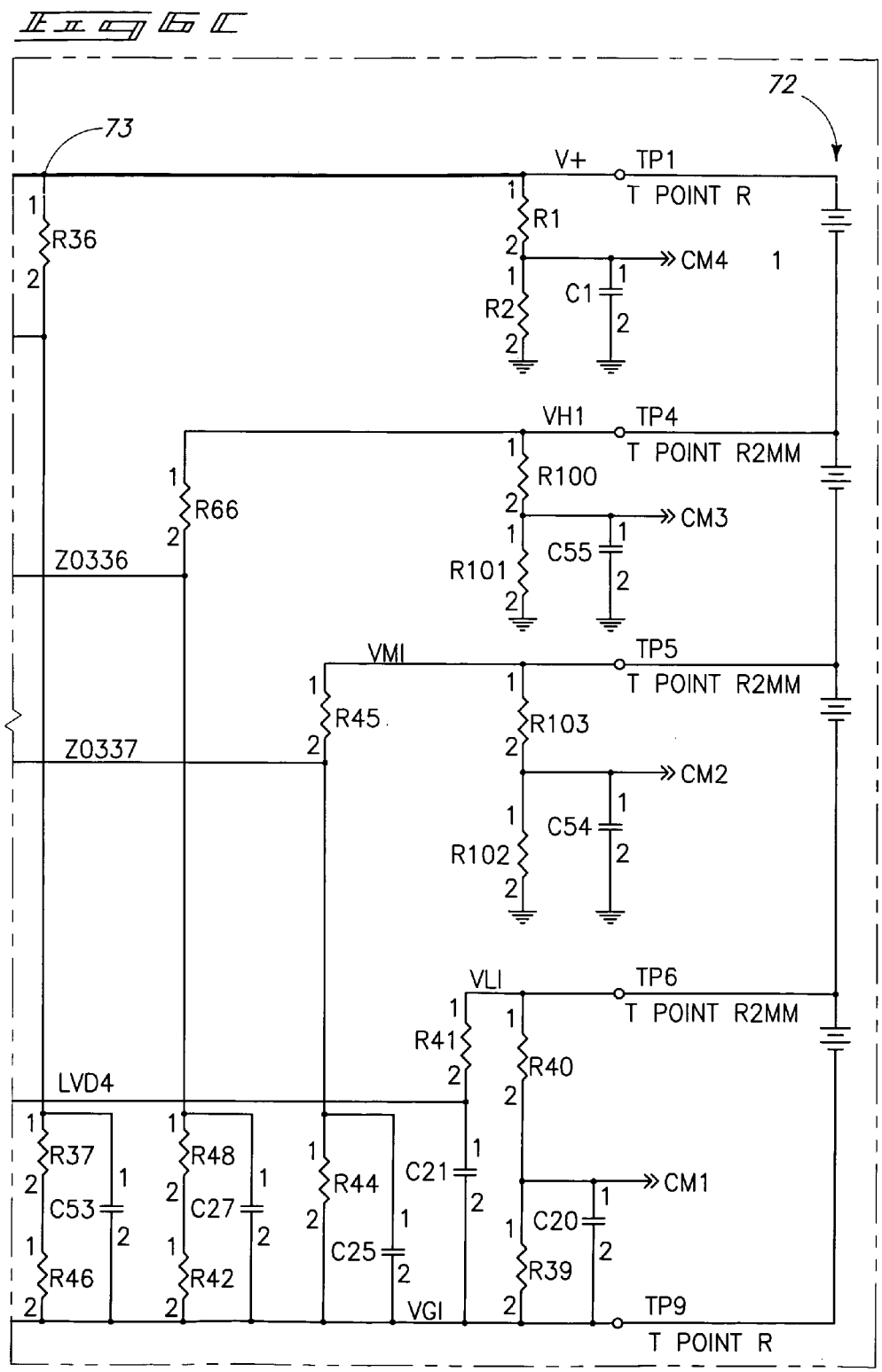
Figure 11:
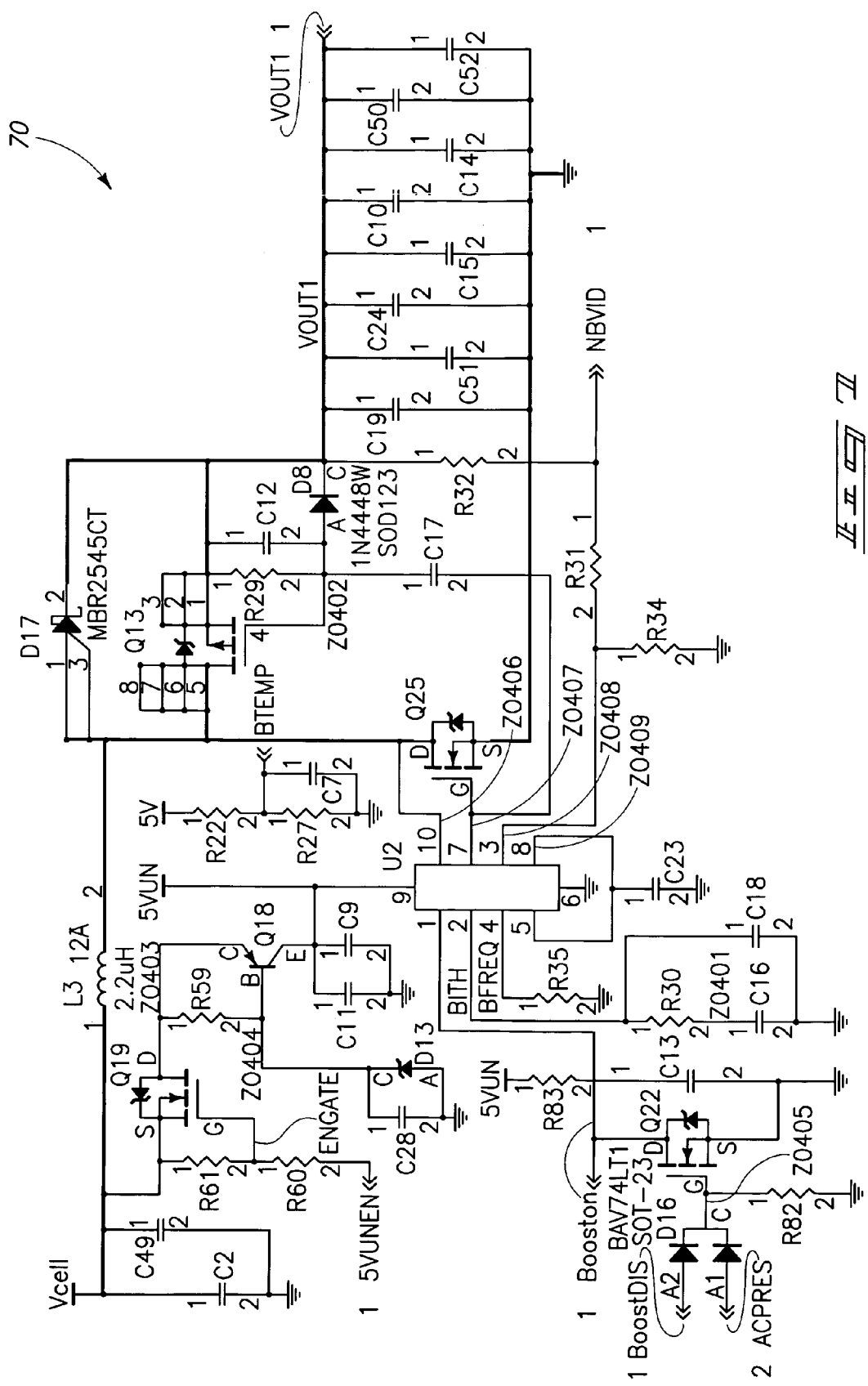

Referring to FIGS. 6A-6C, exemplary configurations of discharge device 64, trickle path 66, charge device 68 are shown. The exemplary configuration of assembly 20a comprises four devices 72 coupled in series with power terminal 73. In addition, a protection device 110 is shown to provide a shut down operation if discharged electrical energy exceeds a threshold (e.g., excessive currents are conducted through power terminal 73). Once protection device 110 is triggered, power supply 10 is recycled prior to resuming operation. In one embodiment, protection device 110 is triggered responsive to the conduction of currents exceeding approximately 20 Amps.

Referring to FIG. 7, an exemplary embodiment of converter 70 arranged as a boost converter is shown. During default operation, converter 70 operates in an enabled mode and node Booston is asserted. During the presence of a fault condition, Booston may be pulled low which provides converter 70 in a disabled operational mode. Further, controller 102 may assert BoostDis for a predetermined period of time to permit correction of a fault responsive to Booston going low. Also, the assertion of ACPRES may provide converter 70 in a disabled operational mode responsive to the presence of electrical energy provided by supply 50. Vout1 comprises conditioned electrical energy applied to the load and corresponding to the requirements of the load in one embodiment.

Referring to FIG. 8, circuitry of assembly 20a includes node OUT+ which is the positive power terminal coupled with connector 74 for applying electrical energy to load 52. Connector 74 may comprise an appropriate resistor which is coupled with node VSET for controlling the voltage regulation of converter 70 corresponding to the requirements of load 52. Overvoltage conditions are monitored using comparator 112 which controls the signal for node Booston to indicate the presence of fault conditions when appropriate.

Referring to FIGS. 9A-9B, exemplary configurations of components of assembly 20b are shown. For example, details regarding a portion of control circuitry 80, discharge device 82, trickle path 84, charge device 86 and device(s) 72 are shown. Control signals CHGAONLY, CHGBONLY and TRICKLE are illustrated to implement the operations described above. In addition, a protection device 120 is shown to provide a shut down operation if discharged electrical energy exceeds a threshold (e.g., excessive currents are conducted through power terminal 83). Similar to the operation of protection device 110, once protection device 120 is triggered, power supply 10 is recycled prior to resuming operation.

Referring to FIG. 10, exemplary details of connector J1 corresponding to connector 44 of assembly 20b are shown. Pins of connector 44 conduct electrical energy power and control signals intermediate coupled assemblies 20a, 20b. A comparator 130 is illustrated to control assertion of TRICKLE responsive to a comparison of the voltages of assemblies 20a, 20b represented by VsenseA and VsenseB, respectively. Signals upon TRICKLE may control charging and discharging operations of discharge device 64, trickle path 84 and charge device 86 similar to the operations discussed above with respect to BoverA and during an absence of electrical energy from supply 50.

The following Tables below provide additional details regarding the exemplary circuit schematics of FIG. 4-10. Other configurations or implementations of the circuits or circuit components are possible.

TABLE A

FIG. 4 TRANSISTOR COMPONENTS

| LABEL | MODEL |
|---|---|
| Q12 | NPN |
| Q16 | MMBT3906 |
| Q21 | FDS6675 SO-8 |
| Q24 | 2N7002 |

TABLE B

FIG. 4 RESISTOR COMPONENTS

| LABEL | VALUE |
|---|---|
| R20 | 540/1% |
| R21 | 4.99K |
| R24 | 540/1% |
| R28 | 540/1% |
| R51 | 100K/1% |
| R52 | 1M |
| R53 | 100K/1% |
| R55 | 100K/1% |
| R67 | 1M/1% |
| R68 | 330K/1% |
| R72 | 100/1% |
| R74 | 470K/1% |
| R76 | 1% |
| R81 | 270K/1% |
| R84 | 100K |
| R86 | 1M/1% |
| R87 | 470K |
| R89 | 1M/1% |
| R90 | 1M/1% |

TABLE B-continued

FIG. 4 RESISTOR COMPONENTS

| LABEL | VALUE |
|---|---|
| R92 | 1% |
| R93 | 1.4M/1% |
| R94 | 200K |
| R95 | 100/1% |
| R96 | 100/1% |
| R97 | 330K/1% |
| R98 | 1M |
| R114 | 470K/1% |

TABLE C

FIG. 4 CAPACITOR COMPONENTS

| LABEL | VALUES | MODEL |
|---|---|---|
| C8 | 4.7 uF/25 V | X7R |
| C29 | 10 uF | |
| C31 | 0.1 uF | |
| C32 | 0.1 uF/25 V | X7R |
| C38 | 0.1 uF/25 V | X7R |
| C46 | 0.1 uF/25 V | X7R 10% |
| C47 | 0.1 uF/25 V | X74 10% |
| C48 | 0.01 uF/25 V | X7R |

TABLE D

FIG. 4 DIODE COMPONENTS

| LABEL | VALUE/MODEL |
|---|---|
| D3 | Z0107 |
| D4 | Z0106 |
| D6 | 5.1 V AC |
| D7 | Z0105 |
| D11 | BAV74LT1 |
| D14 | Z0101 |
| D19 | UPS840 D2 |

TABLE E

FIG. 4 IC COMPONENTS

| LABEL | MODEL |
|---|---|
| U8 | CY8C26443 28 PIN |
| U9 | OPA251 |
| U11 | LM397-5 SOT-23-5 |

TABLE F

| FIG. 4 U8 PIN CONNECTIONS | FIG. 4 U9 PIN CONNECTIONS | FIG. 4 U11 PIN CONNECTIONS |
|---|---|---|
| 1 P07 CM4 | 2 Z0108 | 1 Z0108 |
| 2 P05 CM2 | 3 VSenseB | 2 GND |
| 3 P03 CHGEN | 6 TRICKLE | 3 VSenseB |
| 4 P01 B SNS | | 4 TRICKLE |
| 5 P27 Charger DIS | | |
| 6 P25 BP PRES | | |
| 7 P23 Boost DIS | | |
| 8 P21 LED1 | | |
| 9 SMP X | | |
| 10 P17 ACPRESL | | |
| 11 P15SDA Z0102 | | |
| 12 P13SCL Z0118 | | |
| 13 P11/CLK XCLK | | |

TABLE F-continued

| FIG. 4 U8 PIN CONNECTIONS | FIG. 4 U9 PIN CONNECTIONS | FIG. 4 U11 PIN CONNECTIONS |
|---|---|---|
| 14 GND | GND | |
| 15 P10_XO | XO | |
| 16 P12 | Display | |
| 17 P14 | OutputOV | |
| 18 P16 | SCP Fault | |
| 19 Xres | XRES | |
| 20 P20 | LED0 | |
| 21 P22 | LED2 | |
| 22 924_AGND | GND | |
| 23 P26_Vref | Calibrate | |
| 24 P00 | ConnPres | |
| 25 P02 | BTEMP | |
| 26 P04 | CMI | |
| 27 P06 | CM3 | |
| 28 VCC | VCC | |

TABLE G

FIG. 5 TRANSISTOR COMPONENTS

| LABEL | MODEL |
|---|---|
| Q20 | 2N7002 SOT23 |
| Q23 | FDS6675 SO-8 |
| Q26 | 2N7002 SOT23 |

TABLE H

FIG. 5 RESISTOR COMPONENTS

| LABEL | VALUE |
|---|---|
| R70 | 1K/1% |
| R71 | 590K/1% |
| R73 | 1K/1% |
| R75 | 100/1% |
| R77 | 49.9K/1% |
| R78 | 0.025/1% |
| R79 | 33.2K/1% |
| R80 | 1K/1% |
| R85 | 698K/1% |
| R88 | 100K/1% |
| R91 | 100K/1% |
| R104 | 100/1% |
| R105 | 100K/1% |
| R106 | 100/1% |
| R107 | 330K/1% |
| R108 | 7.32K/1% |
| R109 | 100K/1% |
| R110 | 100K/1% |
| R111 | 100K/1% |
| R112 | 56K/1% |
| R113 | 698K/1% |
| R115 | 10K/1% |
| R116 | 330K/1% |
| R117 | 30805/1% |

TABLE I

FIG. 5 CAPACITOR COMPONENTS

| LABEL | VALUES | MODEL |
|---|---|---|
| C34 | 0.1 uF/25 V | X7R 10% |
| C35 | 10 uF/25 V | X5R 20% |
| C36 | 0.01 uF/25 V | X7R 10% |
| C37 | 0.33 uF/25 V | X7R 10% |
| C39 | 0.33 uF/25 V | X7R 10% |
| C40 | 4.7 uF/16 V | X5R 20% |

TABLE I-continued

FIG. 5 CAPACITOR COMPONENTS

| LABEL | VALUES | MODEL |
|---|---|---|
| C41 | 0.1 uF | |
| C42 | 10 uF | |
| C43 | 10 uF/25 V | X5R 20% |
| C44 | 10 uF/25 V | X5R 20% |
| C45 | 0.1 uF/25 V | X7R 10% |
| C56 | 150 pF/50 V | X7R 10% |
| C57 | 4.7 uF/16 V | X5R 20% |
| C58 | 0.001 uF/50 V | X7R 10% |
| C59 | 0.1 uF/25 V | X7R 10% |

TABLE J

FIG. 5 DIODE COMPONENTS

| LABEL | VALUE/MODEL |
|---|---|
| D15 | UPS840 D2 |
| D18 | 13 V SOT-23 |

TABLE K

FIG. 5 IC COMPONENTS

| LABEL | MODEL |
|---|---|
| U10 | BQ24703 |

TABLE L

FIG. 5 U10 PIN CONNECTIONS

| 1 ACDET | ACDET |
|---|---|
| 2 ACPRES | ACPRES |
| 3 ACSEL | ACSEL |
| 4 BATDEP | Z0210 |
| 5 SRSET | Z0202 |
| 6 ACSET | Z0203 |
| 7 VREF | VREF |
| 8 ENABLE | Z0201 |
| 9 BATSET | GND |
| 10 COMP | COMP |
| 11 ACN | ACN |
| 12 ACP | ACP |
| 13 BATP | BATP |
| 14 IBAT | Z0204 |
| 15 SRN | SRN |
| 16 SRP | SRP |
| 17 GND | GND |
| 18 VS | GND |
| 19 ALARM | ALARM |
| 20 VHSP | VHSP |
| 21 $\overline{PWM}$ | PWM |
| 22 VCC | VCC |
| 23 $\overline{BATDRV}$ | |
| 24 $\overline{ACDRV}$ | ACDRV |

TABLE M

FIG. 6 TRANSISTOR COMPONENTS

| LABEL | MODEL |
|---|---|
| Q1 | FDS6675 |
| Q2 | FDS6675 |
| Q3 | FDS6675 |
| Q4 | FDS6675 |

TABLE M-continued

FIG. 6 TRANSISTOR COMPONENTS

| LABEL | MODEL |
|---|---|
| Q5 | FDN327N |
| Q6 | MMBT3906 |
| Q7 | MMBT3906 |
| Q8 | NDS332P |
| Q9 | 2N7002 |
| Q10 | 2N7002 |
| Q11 | 2N7002 |
| Q14 | 2N7002 |
| Q15 | 2N7002N SOT-23 |
| Q17 | 2N7002 |

TABLE N

FIG. 6 RESISTOR COMPONENTS

| LABEL | VALUE |
|---|---|
| R1 | 1.5M |
| R2 | 1.5M |
| R3 | 100K/1% |
| R4 | 100K/1% |
| R5 | 1M/1% |
| R6 | 10K/1% |
| R7 | 1K/1% |
| R8 | 10K/1% |
| R9 | 30603.00% |
| R10 | 1M/1% |
| R11 | 30.1(0805) 1 W/1% |
| R12 | 151.5K/1% |
| R13 | 100K/1% |
| R14 | 4.99K/1% |
| R15 | 1M/1% |
| R16 | 30603/1% |
| R17 | 47K/1% |
| R18 | 1K/1% |
| R19 | 4.99K/1% |
| R23 | 100K/1% |
| R25 | 1K/1% |
| R26 | 100K/1% |
| R33 | 2.49K/1% |
| R36 | 1.5M |
| R37 | 374K/1% |
| R38 | 100K/1% |
| R39 | 1.5M |
| R40 | 1.5M |
| R41 | 1M/1% |
| R42 | 1.3K/1% |
| R43 | 2.49K/1% |
| R44 | 1M/1% |
| R45 | 1M/1% |
| R46 | 1K/1% |
| R47 | 470K |
| R48 | 432K/1% |
| R49 | 1.5M/1% |
| R54 | 1M/1% |
| R56 | 1M/1% |
| R57 | 2.49K/1% |
| R58 | 1M/1% |
| R62 | 10K/1% |
| R63 | 100/1% |
| R64 | 1M/1% |
| R65 | 1K/1% |
| R66 | 1.3M |
| R99 | 2.49K/1% |
| R100 | 1.5M |
| R101 | 1.5M |
| R102 | 1.5M |
| R103 | 1.5M |

TABLE O

FIG. 6 CAPACITOR COMPONENTS

| LABEL | VALUES | MODEL |
|---|---|---|
| C1 | 0.01 uF/25 V | X7R |
| C3 | 0.1 uF/25 V | X7R 10% |
| C4 | 0.1 uF/25 V | X7R 10% |
| C5 | 0.1 uF | |
| C6 | 0.1 uF | |
| C20 | 0.01 uF/25 V | X7R |
| C21 | 0.1 uF | |
| C22 | 0.47 uF/16 V | X5R |
| C25 | 0.1 uF | |
| C26 | 0.1 uF/25 V | X7R |
| C27 | 0.1 uF | |
| C30 | 0.1 uF/25 V | X7R |
| C53 | 0.1 uF | |
| C54 | 0.01 uF/25 V | X7R |
| C55 | 0.01 uF/25 V | X7R |

TABLE P

FIG. 6 DIODE COMPONENTS

| LABEL | VALUE/MODEL |
|---|---|
| D1 | 1N445W SOD123 |
| D9 | BAV74LT1 SOT-23 |
| D12 | BAV74LT1 SOT-23 |

TABLE Q

FIG. 6 IC COMPONENTS

| LABEL | MODEL |
|---|---|
| U1 | TL431 |
| U3 | TL431 |
| U4 | TL431 |
| U5 | TL431 |
| U6 | TL431 |
| U7-1 | LM393 |

TABLE R

FIG. 7 TRANSISTOR COMPONENTS

| LABEL | MODEL |
|---|---|
| Q13 | FDS6675 SO-8 |
| Q19 | NDS332P |
| Q22 | 2N7002 |
| Q25 | ISL9N302AS3ST TO-263AB |

TABLE S

FIG. 7 RESISTOR COMPONENTS

| LABEL | VALUE |
|---|---|
| R22 | 47K |
| R27 | 100K |
| R29 | 330/1% |
| R30 | 1K/1% |
| R31 | 1K/1% |
| R32 | 10K/1% |
| R34 | 1K/1% |
| R35 | 100K/1% |
| R59 | 1K/1% |
| R60 | 330K/1% |

TABLE S-continued

FIG. 7 RESISTOR COMPONENTS

| LABEL | VALUE |
|---|---|
| R61 | 1M |
| R82 | 1M/1% |
| R83 | 100K/1% |

TABLE T

FIG. 7 CAPACITOR COMPONENTS

| LABEL | VALUES | MODEL |
|---|---|---|
| C2 | 0.1 uF/25 V | X7R 10% |
| C7 | 0.1 uF/25 V | X7R 10% |
| C9 | 0.1 uF | |
| C10 | 10 uF | |
| C11 | 4.7 uF | |
| C12 | 0.01 uF/50 V | X7R 10% |
| C13 | 0.1 uF/25 V | X7R 10% |
| C14 | 10 uF | |
| C15 | 10 uF | |
| C16 | 0.047 uF/25 V | X7R 10% |
| C17 | 0.01 uF/50 V | X7R 10% |
| C18 | 47 pF/50 V | X7R 5% |
| C19 | 10 uF/25 V | X7R 20% |
| C23 | 10 uF/16 V | X5R 20% |
| C24 | 0.1 uF/25 V | X7R 10% |
| C28 | 0.1 uF/25 V | X7R |
| C49 | 10 uF/25 V | X5R 20% |
| C50 | 10 uF | |
| C51 | 10 uF/25 V | X5R 20% |
| C52 | 10 uF | |

TABLE U

FIG. 7 DIODE COMPONENTS

| LABEL | VALUE/MODEL |
|---|---|
| D8 | 1N445W SOD123 |
| D13 | 6.2 V AC |
| D16 | BAC74LT1 SOT-23 |
| D17 | MBR2545CT |

TABLE V

FIG. 7 IC COMPONENTS

| LABEL | MODEL |
|---|---|
| U2 | LCT1871EMS-7 |

TABLE W

FIG. 7 U2 PIN CONNECTIONS

| 1 RUN | Booston |
|---|---|
| 2 ITH | Bith |
| 3 FB | Z0408 |
| 4 Freq | BFreq |
| 5 MS | Z0409 |
| 6 GND | GND |
| 7 Gate | Z0407 |
| 8 IntV | Z0409 |
| 9 Vin | VUN |
| 10 Sense | Z0406 |

TABLE X

FIG. 8 TRANSISTOR COMPONENTS

| LABEL | MODEL |
|---|---|
| Q2 | FDS6675 SO-8 |
| Q3 | FDS6675 SO-8 |
| Q5 | FDS6675 SO-8 |
| Q7 | FDS6675 SO-8 |
| Q16 | NDS332P SOT-23 |
| Q17 | 2N7002 SOT-23 |
| Q18 | 2N7002 SOT-23 |
| Q19 | 2N7002 SOT-23 |

TABLE Y

FIG. 8 RESISTOR COMPONENTS

| LABEL | VALUE |
|---|---|
| R1 | 10K/1% |
| R9 | 4.99K/1% |
| R16 | 150K/1% |
| R15 | 4.99K/1% |
| R22 | 2.49K/1% |
| R25 | 2.49K/1% |
| R27 | 100K/1% |
| R38 | 100K/1% |
| R39 | 1K/1% |
| R40 | DNI/1% |
| R41 | 10K/1% |
| R42 | 100K/1% |
| R43 | 47K/1% |
| R46 | 10K/1% |
| R47 | 1.5M/1% |
| R48 | 100K/1% |
| R49 | 10K/1% |
| R50 | 1M/1% |

TABLE Z

FIG. 8 CAPACITOR COMPONENTS

| LABEL | VALUES | MODEL |
|---|---|---|
| C1 | 0.1 uF/25 V | X7R 10% |
| C3 | 10 uF/25 V | X5R 20% |
| C4 | 10 uF/25 V | X5R 20% |
| C6 | 0.1 uF/25 V | X7R 10% |

TABLE AA

FIG. 8 DIODE COMPONENTS

| LABEL | VALUE/MODEL |
|---|---|
| D11 | 5.1 V SOT-23 |
| D58 | BAV74LT1 SOT-23 |
| D59 | 5.1 V SOT-23 |
| D60 | BAV74LT1 SOT-23 |

TABLE BB

FIG. 8 IC COMPONENTS

| LABEL | MODEL |
|---|---|
| U2 | NCS2200 SOT-23-5 |
| U25 | TL431 |

TABLE CC

FIG. 8 U2 PIN CONNECTIONS

| | |
|---|---|
| 1 | OVDET |
| 2 | Z0117 |
| 3 | Z0118 |
| 4 | Z0107 |
| 5 | GND |

TABLE DD

FIG. 9 TRANSISTOR COMPONENTS

| LABEL | MODEL |
|---|---|
| Q1 | 2N7002 SOT-23 |
| Q2 | 2N7002 |
| Q3 | FDS6675 |
| Q4 | MMBT3906 |
| Q5 | FDS6675 |
| Q6 | 2N7002 |
| Q7 | NDS332P |
| Q8 | FDN327N |
| Q9 | 2N7002 SOT-23 |
| Q10 | FDS6675 |
| Q11 | FDS6675 |
| Q12 | MMBT3906 |
| Q13 | 2N7002 SOT-23 |
| Q14 | 2N7002 SOT-23 |
| Q16 | MMBT3904 |

TABLE EE

FIG. 9 RESISTOR COMPONENTS

| LABEL | VALUE |
|---|---|
| R1 | 432K/1% |
| R2 | 1.3K/1% |
| R4 | 1K/1% |
| R5 | 1.5M |
| R6 | 1K/1% |
| R7 | 1M/1% |
| R8 | 374K/1% |
| R9 | 1.3M |
| R10 | 10K/1% |
| R11 | 1M/1% |
| R12 | 470K/1% |
| R13 | 1M/1% |
| R14 | 1K/1% |
| R15 | 47K/1% |
| R17 | 330K/1% |
| R18 | 470K/1% |
| R19 | 1.5M/1% |
| R20 | 1M/1% |
| R21 | 2.49K/1% |
| R22 | 2.49K/1% |
| R23 | 1 W/1% |
| R24 | 1M/1% |
| R25 | 100K/1% |
| R26 | 470K/1% |
| R27 | 1M/1% |
| R28 | 470K/1% |
| R33 | 3/1% |
| R34 | 1M/1% |
| R35 | 470K/1% |
| R36 | 100K/1% |
| R37 | 3/1% |
| R40 | 151.5K/1% |
| R42 | 100/1% |
| R43 | 47K/1% |
| R44 | 100K/1% |
| R46 | 1M/1% |
| R47 | 100K/1% |

TABLE EE-continued

FIG. 9 RESISTOR COMPONENTS

| LABEL | VALUE |
|---|---|
| R48 | 1K/1% |
| R49 | 100/1% |
| R52 | 10K/1% |
| R53 | 4.99K/1% |
| R54 | 1M/1% |
| R55 | 4.99K/1% |
| R56 | 470K/1% |
| R57 | 2.49K/1% |
| R58 | 2.49K/1% |
| R59 | 10K/1% |

TABLE FF

FIG. 9 CAPACITOR COMPONENTS

| LABEL | VALUES | MODEL |
|---|---|---|
| C1 | 0.1 uF/25 V | X7R 10% |
| C2 | 0.1 uF/25 V | X7R 10% |
| C3 | 0.1 uF | |
| C4 | 0.1 uF | |
| C5 | 0.1 uF | |
| C6 | 0.1 uF | |
| C8 | 0.1 uF/25 V | X7R |
| C13 | 0.1 uF/25 V | X7R |
| C16 | 0.47 uF/16 V | X5R |
| C17 | 1 uF/25 V | X7R |
| C18 | 0.1 uF/25 V | X7R |
| C21 | 0.1 uF/25 V | X7R |

TABLE GG

FIG. 9 DIODE COMPONENTS

| LABEL | VALUE/MODEL |
|---|---|
| D1 | BAV74LT1 SOT-23 |
| D2 | BAV74LT1 SOT-23 |
| D3 | 1N4448W SOD123 |
| D4 | BAV74LT1 SOT-23 |
| D5 | BAV74LT1 SOT-23 |
| D7 | 6.2 V SOT-23 |

TABLE HH

FIG. 9 IC COMPONENTS

| LABEL | MODEL |
|---|---|
| U1 | TL431 |
| U2 | TL431 |
| U4 | TL431 |
| U6-1 | LM393 |
| U7 | TL431 |
| U8 | TL431 |

TABLE II

FIG. 9 U6-1 PIN CONNECTIONS

| | |
|---|---|
| 1 | Z0231 |
| 2 | Z0230 |
| 3 | Z0229 |
| 4 | GND |
| 8 | Z0219 |

TABLE JJ

FIG. 10 RESISTOR COMPONENTS

| LABEL | VALUE |
|---|---|
| R3 | 330K/1% |
| R16 | 1M/1% |
| R29 | 1M/1% |
| R31 | 100/1% |
| R32 | 270K/1% |
| R38 | 100/1% |

TABLE KK

FIG. 10 CAPACITOR COMPONENTS

| LABEL | VALUES | MODEL |
|---|---|---|
| C7 | 1000 pF | |
| C9 | 0.1 uF/25 V | X7R 10% |
| C11 | 0.1 uF/25 V | X7R 10% |

TABLE LL

FIG. 10 IC COMPONENTS

| LABEL | MODEL |
|---|---|
| U3 | OPA251 SO8 |
| U9 | LM397 SOT-23-5 |

TABLE MM

| FIG. 10 U3 PIN CONNECTIONS | FIG. 10 U9 PIN CONNECTIONS |
|---|---|
| 2 VsenseB | 1 VsenseB |
| 3 VsenseA | 2 GND |
| 4 GND | 3 VsenseA |
| 6 TRICKLE | 4 TRICKLE |
| 7 Z0103 | 5 Z0103 |

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An electrical energy supply method comprising:
providing first and second battery assemblies individually configured to store electrical energy;
coupling the first and second battery assemblies to form a unitary device configured to supply electrical energy to a load;
charging one of the first and second battery assemblies using electrical energy from a supply at a first moment in time;
discharging electrical energy from the first and second battery assemblies to the load at a second moment in time; and
disabling discharging of electrical energy from one of the first and second battery assemblies during the charging and after the coupling of the first and second batteries to form the unitary device.

2. The method of claim 1 further comprising supplying electrical energy to a load using one of the battery assemblies before the coupling.

3. The method of claim 1 further comprising disabling the discharging responsive to a quantity of discharged electrical energy exceeding a threshold.

4. The method of claim 1 further comprising charging one of the first and the second battery assemblies using electrical energy of the other of the first and the second battery assemblies during an absence of electrical energy from the supply at a third moment in time.

5. The method of claim 4 wherein the charging using the electrical energy of the other of first and the second battery assemblies comprises charging at a rate less than charging using the electrical energy from the supply.

6. The method of claim 4 wherein the disabling disables the charging using the electrical energy from the other of the first and the second battery assemblies.

7. The method of claim 1 wherein the charging comprises first charging, and further comprising second charging comprises charging both of the first and the second battery assemblies having substantially equal voltages at a third moment in time using electrical energy from the supply, and wherein the first charging comprises charging only the one of the first and second battery assemblies having a voltage less than a voltage of the other of the first and second battery assemblies at the first moment in time using electrical energy from the supply.

8. The method of claim 1 wherein the coupling comprises mechanically coupling respective housings of the first and second battery assemblies to form the unitary device.

9. The method of claim 1 further comprising:
converting the electrical energy discharged from the first and the second battery assemblies to a desired one of a plurality of output voltages, wherein the desired one corresponds to the load; and
connecting the coupled first and the second battery assemblies to the load, and wherein the connecting specifies the desired one of the output voltages.

10. The method of claim 1 wherein one of the first and the second battery assemblies is configured as an individual source configured to supply electrical energy to a load separate from the other of the first and the second battery assemblies.

11. The method of claim 10 wherein the other of the first and the second battery assemblies is only configured to supply electrical energy to a load when coupled with the one of the first and the second battery assemblies.

12. The method of claim 1 wherein the disabling comprises disabling using control circuitry of the one of the first and second battery assemblies.

13. The method of claim 1 wherein the providing comprises providing at least one of the first and the second battery assemblies including an electrochemical device comprising an electrode active material represented by the formula:

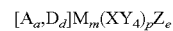

wherein:
(i) A is selected from the group consisting of elements from Group I of the Periodic Table, and mixtures thereof, and $0 < a \leq 9$;
(ii) D is at least one element with a valence state of $\leq 2+$, and $0 \leq d \leq 1$;

(iii) M includes at least one redox active element, and $1 \leq m \leq 3$;

(iv) $XY_4$ is selected from the group consisting of $X'[O_{4-x}, Y'_x]$, $X'[O_{4-y}, Y'_{2y}]$, $X''S_4$, $[X_z''', X'_{1-z}]O_4$, and mixtures thereof, wherein:
  (a) X' and X''' are each independently selected from the group consisting of P, As, Sb, Si, Ge, V, 5, and mixtures thereof;
  (b) X'' is selected from the group consisting of P, As, Sb, Si, Ge, V, and mixtures thereof;
  (c) Y' is selected from the group consisting of a halogen, S, N, and mixtures thereof; and
  (d) $0 \leq x \leq 3$, $0 \leq y \leq 2$, $0 \leq z \leq 1$ and $1 \leq p \leq 3$; and (v) Z is OH, a halogen, or mixtures thereof, and $0 \leq e \leq 4$; wherein A, D, M, X, Y, Z, a, d, x, y, z, p and e are selected so as to maintain electroneutrality of the material.

14. The method of claim 13 wherein the active material is represented by the formula:

$$A_a M\ PO_4$$

wherein:
  (i) A is Li, and $0 < a \leq 1$; and
  (ii) M=MIn-pMIIO, wherein o=p, $0 < o \leq 0.5$, MI is iron (Fe), and MII is selected from the group consisting of Be2+, Mg2+, Ca2+, Sr2+, Ba2+, and mixtures thereof.

15. An electrical energy supply method comprising:
providing first and second battery assemblies individually configured to store electrical energy;
coupling the first and second battery assemblies to form a unitary device configured to supply electrical energy to a load;
providing electrical energy to the coupled first and second battery assemblies using a supply;
charging only one of the coupled first and second battery assemblies using the electrical energy from the supply at a first moment in time; and
providing electrical energy stored using the first and the second battery assemblies to the load at a second moment in time.

16. The method of claim 15 further comprising charging both of the coupled first and the second battery assemblies at a third moment in time using the electrical energy from the supply.

17. The method of claim 16 wherein the one of the first and the second battery assemblies has a voltage lower than an other of the first and the second battery assemblies at the first moment in time and the voltages of the first and the second battery assemblies are substantially equal at the second and third moments in time.

18. The method of claim 15 wherein the coupling comprises coupling power terminals of the first and the second battery assemblies, and the charging comprises charging only the one of the first and the second battery assemblies with the power terminals coupled.

19. The method of claim 18 further comprising substantially directly electrically coupling electrochemical devices of the first and the second battery assemblies responsive to the first and the second battery assemblies having a substantially equal voltage and after the coupling of the power terminals.

20. The method of claim 15 further comprising charging the one of the coupled first and second battery assemblies using electrical energy from the other of the coupled first and second battery assemblies in the absence of electrical energy from the supply.

21. The method of claim 20 further comprising disabling the charging using the electrical energy from the other of the coupled first and second battery assemblies responsive to the providing the electrical energy using the supply.

22. The method of claim 15 wherein the coupling comprises mechanically coupling respective housings of the first and second battery assemblies to form the unitary device.

23. The method of claim 15 further comprising controlling the charging of the one of the coupled first and second battery assemblies using control circuitry of the other of the coupled first and second battery assemblies.

24. The method of claim 15 wherein the providing comprises providing at least one of the first and the second battery assemblies including an electrochemical device comprising an electrode active material represented by the formula:

$$[A_a, D_d] M_m (XY_4)_p Z_e$$

wherein:
  (i) A is selected from the group consisting of elements from Group II of the Periodic Table, and mixtures thereof, and $0 < a \leq 9$;
  (ii) D is at least one element with a valence state of $\leq 2+$, and $0 \leq d \leq 1$;
  (iii) M includes at least one redox active element, and $1 \leq m \leq 3$;
  (iv) $XY_4$ is selected from the group consisting of $X'[O_{4-x}, Y'_x]$, $X'[O_{4-y}, Y'_{2y}]$, $X''S_4$, $[X_z''', X'_{1-z}]O_4$, and mixtures thereof, wherein:
    (a) X' and X''' are each independently selected from the group consisting of P, As, Sb, Si, Ge, V, 5, and mixtures thereof;
    (b) X'' is selected from the group consisting of P, As, Sb, Si, Ge, V, and mixtures thereof;
    (c) Y' is selected from the group consisting of a halogen, S, N, and mixtures thereof, and
    (d) $0 \leq x \leq 3$, $0 \leq y \leq 2$, $0 \leq z \leq 1$, and $1 \leq p \leq 3$; and
  (v) Z is OH, a halogen, or mixtures thereof, and $0 \leq e \leq 4$; wherein A, D, M, X, Y, Z, a, d, x, y, z, p and e are selected so as to maintain electroneutrality of the material.

25. The method of claim 24 wherein the active material is represented by the formula:

$$A_a M\ PO_4$$

wherein:
  (i) A is Li, and $0 < a \leq 1$; and
  (ii) M=MIn-pMIIO, wherein o=p, $0 < o \leq 0.5$, MI is iron (Fe), and MII is selected from the group consisting of Be2+, Mg2+, Ca2+, Sr2+, Ba2+, and mixtures thereof.

26. An electrical energy supply method comprising:
providing first and second battery assemblies individually configured to store electrical energy;
coupling the first and second battery assemblies to form a unitary device configured to supply electrical energy to a load;
providing electrical energy from the battery assemblies to the load during an absence of electrical energy from a supply;
first charging only one of the coupled battery assemblies having a voltage less than a voltage of the other of the coupled battery assemblies using electrical energy from the other of the battery assemblies;
providing electrical energy from a supply to the device during the first charging;
second charging the other one of the battery assemblies using the electrical energy from the supply; and
disabling the first charging responsive to the providing the electrical energy from the supply.

27. The method of claim 26 wherein the second charging comprises only charging the one of the coupled battery assemblies having a voltage less than the other of the coupled battery assemblies.

28. The method of claim 27 further comprising third charging both of the coupled battery assemblies using electrical energy from the supply responsive to convergence of the voltages of the coupled battery assemblies.

29. The method of claim 26 wherein the coupling comprises mechanically coupling respective housings of the first and second battery assemblies to form the unitary device.

30. The method of claim 26 wherein the providing comprises providing at least one of the first and the second battery assemblies including an electrochemical device comprising an electrode active material represented by the formula:

$$[A_a,D_d]M_m(XY_4)_pZ_e$$

wherein:
(i) A is selected from the group consisting of elements from Group I of the Periodic Table, and mixtures thereof, and $0<a\leq9$;
(ii) D is at least one element with a valence state of $\leq2+$, and $0\leq d\leq1$;
(iii) M includes at least one redox active element, and $1\leq m\leq3$;
(iv) $XY_4$ is selected from the group consisting of $X'[O_{4-x},Y'_x]$, $X'[O_{4-y},Y'_{2y}]$, $X''S_4$, $[X_z''',X'_{1-z}]O_4$, and mixtures thereof, wherein:
 (a) X' and X''' are each independently selected from the group consisting of P, As, Sb, Si, Ge, V, 5, and mixtures thereof;
 (b) X'' is selected from the group consisting of P, As, Sb, Si, Ge, V, and mixtures thereof;
 (c) Y' is selected from the group consisting of a halogen, S, N, and mixtures thereon and
 (d) $0\leq x\leq3$, $0\leq y\leq2$, $0\leq z\leq1$, and $1\leq p\leq3$; and
(v) Z is OH, a halogen, or mixtures thereof, and $0\leq e\leq4$;
wherein A, D, M, X, Y, Z, a, d, x, y, z, p and e are selected so as to maintain electroneutrality of the material.

31. The method of claim 30 wherein the active material is represented by the formula:

$$A_aM\,PO_4$$

wherein:
(i) A is Li, and $0<a\leq1$; and
(ii) M=MIn-pMIIO, wherein o=p, 0<o<0.5, MI is iron (Fe), and MII is selected from the group consisting of Be2+, Mg2+, Ca2+, Sr2+, Ba2+, and mixtures thereof.

32. An electrical energy power supply comprising:
a first battery assembly comprising a housing and at least one electrochemical device configured to store electrical energy;
a second battery assembly comprising a housing and at least one electrochemical device configured to store electrical energy, wherein the housings are configured to be removably coupled with one another and to form a unitary device during coupling thereof;
a connector coupled with the first and second battery assemblies and configured to receive electrical energy from a supply; and
control circuitry configured to detect the presence of electrical energy from the supply and to control application of the electrical energy to only one of the first and the second battery assemblies responsive to the one of the first and the second battery assemblies having a voltage less than a voltage of the other of the first and the second battery assemblies.

33. The supply of claim 32 wherein the other of the first and the second battery assemblies comprises at least a portion of the control circuitry, and the control circuitry is configured to control at least one operation of the one of the first and the second battery assemblies.

34. The supply of claim 33 wherein the operation comprises the application of the electrical energy to the at least one electrochemical device of the one of the first and the second battery assemblies.

35. The supply of claim 32 wherein the one of the first and the second battery assemblies comprises an entirety of the control circuitry.

36. The supply of claim 32 wherein at least one of the electrochemical devices comprises an electrode active material represented by the formula:

$$[A_a,D_d]M_m(XY_4)_pZ_e$$

wherein:
(i) A is selected from the group consisting of elements from Group I of the Periodic Table, and mixtures thereof, and $0<a\leq9$;
(ii) D is at least one element with a valence state of $\leq2+$, and $0\leq d\leq1$;
(iii) M includes at least one redox active element, and $1\leq m\leq3$;
(iv) $XY_4$ is selected from the group consisting of $X'[O_{4-x},Y'_x]$, $X'[O_{4-y},Y'_{2y}]$, $X''S_4$, $[X_z''',X'_{1-z}]O_4$, and mixtures thereof, wherein:
 (a) X' and X''' are each independently selected from the group consisting of P, As, Sb, Si, Ge, V, S, and mixtures thereof;
 (b) X'' is selected from the group consisting of P, As, Sb, Si, Ge, V, and mixtures thereof;
 (c) Y' is selected from the group consisting of a halogen, 5, N, and mixtures thereof; and
 (d) $0\leq x\leq3$, $0\leq y\leq2$, $0\leq z\leq1$, and $1\leq p\leq3$; and
(v) Z is OH, a halogen, or mixtures thereof; and $0\leq e\leq4$;
wherein A, D, M, X, Y, Z, a, d, x, y, z, p and e are selected so as to maintain electroneutrality of the material.

37. The supply of claim 36 wherein the active material is represented by the formula:

$$A_aM\,PO_4$$

wherein:
(i) A is Li, and $0<a\leq1$; and
(ii) M=MIn-pMIIO, wherein o=p, 0<o<0.5, MI is iron (Fe), and MII is selected from the group consisting of Be2+, Mg2+, Ca2+, Sr2+, Ba2+, and mixtures thereof.

* * * * *